US010915523B1

(12) United States Patent
Paiz

(10) Patent No.: US 10,915,523 B1
(45) Date of Patent: Feb. 9, 2021

(54) CODEX SEARCH PATTERNS

(71) Applicant: Richard Paiz, N. Miami Beach, FL (US)

(72) Inventor: Richard Paiz, N. Miami Beach, FL (US)

(*) Notice: Subject to any disclaimer, the term of this patent is extended or adjusted under 35 U.S.C. 154(b) by 1020 days.

(21) Appl. No.: 15/390,713

(22) Filed: Dec. 26, 2016

Related U.S. Application Data

(60) Continuation-in-part of application No. 15/352,555, filed on Nov. 15, 2016, now abandoned, which is a division of application No. 15/264,996, filed on Sep. 14, 2016, which is a division of application No. 15/246,446, filed on Aug. 24, 2016, which is a division of application No. 15/175,861, filed on Jun. 7, 2016, which is a division of application No. 14/682,052, filed on Apr. 8, 2015, which is a division of application No. 14/623,559, filed on Feb. 17, 2015, which is a division of application No. 14/582,236,
(Continued)

(51) Int. Cl.
*G06F 16/242* (2019.01)
*H04L 29/08* (2006.01)
*G06F 16/951* (2019.01)

(52) U.S. Cl.
CPC .......... *G06F 16/243* (2019.01); *G06F 16/951* (2019.01); *H04L 67/18* (2013.01); *H04L 67/02* (2013.01)

(58) Field of Classification Search
CPC ..... G06F 16/243; G06F 16/951; H04L 67/02; H04L 67/18
See application file for complete search history.

(56) References Cited

U.S. PATENT DOCUMENTS 5,025,369 A 6/1991 Schwartz
5,063,506 A 11/1991 Brockweil et al.
(Continued)

FOREIGN PATENT DOCUMENTS

EP 0448800 A1 10/1991

OTHER PUBLICATIONS

Robertson, et al. "Cone Trees: Animated Visualization of Hierarchical Information", 1991.
(Continued)

*Primary Examiner* — Matthew J Ellis
(74) *Attorney, Agent, or Firm* — Jonathan Torchman; Torchman IP LLC

(57) ABSTRACT

A Codex human knowledge encyclopedia including a webpage database residing in the Codex and stored in non-volatile digital memory, a master index and a partial master index for each element of the Codex, an optimizer receiving from a computing device interactive input, and executing software instructions to transform input based on rules of grammar and semantics into a search pattern and personalizing the search pattern by adding Global Positioning System (GPS) coordinates from the computing device. Mapping the search pattern to an element stored in the Codex and upon identifying the search pattern, obtaining the optimal dataset from the Codex bypassing all calculations since optimal dataset is readily available, picking and arranging, in an order from highest to lowest, from the optimal dataset, the top responses as output based on personalized usage pattern of behavior, and displaying the output to the user.

20 Claims, 8 Drawing Sheets

Related U.S. Application Data filed on Dec. 24, 2014, which is a division of application No. 14/578,439, filed on Dec. 21, 2014, now abandoned, which is a division of application No. 14/474,268, filed on Sep. 1, 2014, now abandoned, which is a division of application No. 14/028,508, filed on Sep. 16, 2013, now Pat. No. 9,355,352, which is a continuation-in-part of application No. 14/013,018, filed on Aug. 28, 2013, now abandoned, which is a continuation-in-part of application No. 13/777,775, filed on Feb. 26, 2013, now Pat. No. 8,977,621, which is a continuation-in-part of application No. 13/247,964, filed on Sep. 28, 2011, now Pat. No. 8,868,535, which is a continuation-in-part of application No. 12/785,122, filed on May 21, 2010, now Pat. No. 8,386,456, which is a continuation-in-part of application No. 12/778,228, filed on May 12, 2010, now Pat. No. 8,239,229.

(56) References Cited

U.S. PATENT DOCUMENTS

| | | |
|---|---|---|
| 5,585,839 A | 12/1996 | Ishida et al. |
| 5,671,363 A | 9/1997 | Cristofich et al. |
| 5,706,497 A | 1/1998 | Takahashi et al. |
| 5,762,552 A | 6/1998 | Vuong et al. |
| 5,790,935 A | 8/1998 | Payton |
| 5,794,210 A | 8/1998 | Goldhaber et al. |
| 5,809,282 A | 9/1998 | Cooper et al. |
| 5,819,258 A | 10/1998 | Vaithyanathan et al. |
| 5,832,069 A | 11/1998 | Waters et al. |
| 5,873,099 A | 2/1999 | Hogan et al. |
| 5,878,113 A | 3/1999 | Bhusri |
| 5,878,127 A | 3/1999 | Fleischer, III |
| 5,881,269 A | 3/1999 | Dobbelstein |
| 5,910,981 A | 6/1999 | Bhagat et al. |
| 5,917,899 A | 6/1999 | Moss et al. |
| 5,931,901 A | 8/1999 | Wolfe et al. |
| 6,028,924 A | 2/2000 | Ram et al. |
| 6,069,310 A | 5/2000 | James |
| 6,078,657 A | 6/2000 | Alfieri et al. |
| 6,088,733 A | 7/2000 | Kikuchi |
| 6,128,378 A | 10/2000 | Diener et al. |
| 6,219,652 B1 | 4/2001 | Carter et al. |
| 6,243,480 B1 | 6/2001 | Zhao et al. |
| 6,256,627 B1 | 7/2001 | Beattie et al. |
| 6,264,560 B1 | 7/2001 | Goldberg et al. |
| 6,282,653 B1 | 8/2001 | Berstis et al. |
| 6,330,672 B1 | 12/2001 | Shur |
| 6,345,182 B1 | 2/2002 | Fabritius et al. |
| 6,363,253 B1 | 3/2002 | Valentine et al. |
| 6,408,282 B1 | 6/2002 | Buist |
| 6,427,132 B1 | 7/2002 | Bowman-Amuah |
| 6,442,169 B1 | 8/2002 | Lewis |
| 6,445,785 B1 | 9/2002 | Chan et al. |
| 6,463,275 B1 | 10/2002 | Deakin |
| 6,490,345 B2 | 12/2002 | Fleischer et al. |
| 6,508,709 B1 | 1/2003 | Karmarkar |
| 6,510,419 B1 | 1/2003 | Gatto |
| 6,529,592 B1 | 3/2003 | Khan |
| 6,529,878 B2 | 3/2003 | De Rafael et al. |
| 6,601,044 B1 | 7/2003 | Wallman |
| 6,614,781 B1 | 9/2003 | Elliott et al. |
| 6,629,890 B2 | 10/2003 | Johnson |
| 6,661,884 B2 | 12/2003 | Shaffer et al. |
| 6,915,268 B2 | 7/2005 | Riggs et al. |
| 6,947,540 B2 | 9/2005 | Madoch et al. |
| 6,963,867 B2 | 11/2005 | Ford et al. |
| 7,006,988 B2 | 2/2006 | Lin et al. |
| 7,059,515 B2 | 6/2006 | White |
| 7,103,536 B1 | 9/2006 | Kanno |
| 7,194,483 B1 * | 3/2007 | Mohan ............... G06F 16/30 707/600 |
| 7,499,914 B2 | 3/2009 | Dieb et al. |
| 7,552,395 B2 | 6/2009 | Neale et al. |
| 7,660,815 B1 | 2/2010 | Scofield et al. |
| 7,725,465 B2 | 5/2010 | Liao et al. |
| 7,756,850 B2 | 7/2010 | Keith, Jr. |
| 7,890,526 B1 | 2/2011 | Brewer et al. |
| 8,452,765 B2 | 5/2013 | Hoffman et al. |
| 8,903,800 B2 | 12/2014 | Kakade et al. |
| 10,430,410 B2 * | 10/2019 | Briggs ............ G06F 16/24542 |
| 2002/0042793 A1 | 4/2002 | Choi |
| 2002/0049622 A1 | 4/2002 | Lettich et al. |
| 2002/0137217 A1 | 9/2002 | Rowe |
| 2003/0018547 A1 | 1/2003 | Steele |
| 2003/0050819 A1 | 3/2003 | Koenigbauer et al. |
| 2003/0163454 A1 * | 8/2003 | Jacobsen ............ G06F 16/951 |
| 2004/0024739 A1 | 2/2004 | Copperman et al. |
| 2004/0093325 A1 | 5/2004 | Banerjee et al. |
| 2004/0230564 A1 * | 11/2004 | Simon ............... G06F 16/951 |
| 2005/0114324 A1 | 5/2005 | Mayer |
| 2005/0165753 A1 | 7/2005 | Chen et al. |
| 2006/0242098 A1 | 10/2006 | Wnek |
| 2007/0050393 A1 | 3/2007 | Vogel et al. |
| 2008/0059486 A1 * | 3/2008 | Pappas ............. G06F 16/2423 |
| 2008/0077880 A1 * | 3/2008 | Oygard ............. G06F 3/0485 715/799 |
| 2008/0097993 A1 * | 4/2008 | Nanba ............. G06F 16/3331 |
| 2008/0168033 A1 | 7/2008 | Ott et al. |
| 2008/0195477 A1 | 8/2008 | Kennedy et al. |
| 2009/0100125 A1 | 4/2009 | McDowell |
| 2009/0282022 A1 | 11/2009 | Bennett |
| 2010/0017267 A1 | 1/2010 | Negron |
| 2011/0125743 A1 | 5/2011 | Immonen et al. |
| 2011/0145088 A1 | 6/2011 | Bonner et al. |
| 2011/0219295 A1 | 9/2011 | Adams et al. |
| 2011/0238500 A1 * | 9/2011 | Kim ............... G06Q 30/0251 705/14.54 |
| 2012/0075168 A1 * | 3/2012 | Osterhout ............ G06F 3/011 345/8 |
| 2013/0304623 A1 * | 11/2013 | Kumar ............... G06Q 40/04 705/37 |
| 2016/0034462 A1 * | 2/2016 | Brewer ............. G06F 16/9024 707/734 |
| 2016/0034463 A1 * | 2/2016 | Brewer ............... H04L 43/12 707/734 |
| 2018/0182170 A1 * | 6/2018 | Lim ............... G06T 19/006 |

OTHER PUBLICATIONS

Hearst, et al, "Cat-a-Cone: An Interactive Interface for Specifying Searches and Viewing Retrieval Results using a Large Category Hierarchy", 1997.

Zamir, et al. "Grouper: A Dynamic Clustering Interface to Web Search Results", 1999.

Dumais, et al. "Hierarchical Classification of Web Content", 2000.

Wen, et al. "Clustering User Queries of a Search Engine", 2001.

Yue, et al., "A Video Summarization Tool Using Two-Level Redundancy Detection for Personal Video recorders", 2010.

Unknown, American Banker, "Chemical Buys Trading Software from Reuters", ( v 154, n 145, p. 14, Dialog file 9, Accession No. 00500233), 1994.

Croneliusson, Roy, SAP-R3, Jan. 1999. Downloaded from https:llqupea.ub.gu.se/dspace/bitstrearn/2077/1359/1/hattab.IA7400.pdf downloaded on Mar. 26, 2008, 47 pages.

SAP-CAPS, 1999. Downloaded from http://web.archive.org/web/19991105101002/www.caps.com/products/sap/sapr3.htm, 3 Pages.

RoutePro, 1999, Downloaded from http://web.archive.org/web/20010627035933/www.caps.com/products/rprodsgrfrpdsgrfeat.htm, 2 pages.

\* cited by examiner

US 10,915,523 B1

CODEX SEARCH PATTERNS

CROSS REFERENCE TO RELATED APPLICATIONS

This Patent Application is a Continuation-In-Part claiming the benefit of:
co-pending U.S. patent application Ser. No. 15/352,555 filed on Nov. 15, 2016,
  wherein U.S. patent application Ser. No. 15/352,555 is a Divisional Application claiming the benefit of co-pending U.S. patent application Ser. No. 15/264,996 filed on Sep. 14, 2016,
  wherein U.S. patent application Ser. No. 15/264,996 is a Divisional Application claiming the benefit of co-pending U.S. patent application Ser. No. 15/246,446 filed on Aug. 24, 2016,
  wherein U.S. patent application Ser. No. 15/246,446 is a Divisional Application claiming the benefit of co-pending U.S. patent application Ser. No. 15/175,861 filed on Jun. 7, 2016,
  wherein U.S. patent application Ser. No. 15/175,861 is a Divisional Application claiming the benefit of co-pending U.S. patent application Ser. No. 14/682,052 filed on Apr. 8, 2015,
  wherein U.S. patent application Ser. No. 14/682,052 is a Divisional Application claiming the benefit of co-pending U.S. patent application Ser. No. 14/623,559 filed on Feb. 17, 2015,
  wherein U.S. patent application Ser. No. 14/623,559 is a Divisional Application claiming the benefit of co-pending U.S. patent application Ser. No. 14/582,236 filed on Dec. 24, 2014,
  wherein U.S. patent application Ser. No. 14/582,236 is a Divisional Application claiming the benefit of co-pending U.S. patent application Ser. No. 14/578,439 filed on Dec. 21, 2014,
  wherein U.S. patent application Ser. No. 14/578,439 is a Divisional Application claiming the benefit of U.S. patent application Ser. No. 14/474,268 filed on Sep. 1, 2014,
  wherein U.S. patent application Ser. No. 14/474,268 is a Divisional Application claiming the benefit of U.S. patent application Ser. No. 14/028,508 filed on Sep. 16, 2013 (issued as U.S. Pat. No. 9,355,352 on May 31, 2016),
  wherein U.S. patent application Ser. No. 14/028,508 is a Continuation-In-Part claiming the benefit of co-pending U.S. patent application Ser. No. 14/013,018 filed on Aug. 28, 2013 (now abandoned),
  wherein U.S. patent application Ser. No. 14/013,018 is a Continuation-In-Part claiming the benefit of co-pending U.S. patent application Ser. No. 13/777,775 filed on Feb. 26, 2013 (issued as U.S. Pat. No. 8,977,621 on Mar. 10, 2015),
  wherein U.S. patent application Ser. No. 13/777,775 is a Continuation-In-Part claiming the benefit of co-pending U.S. patent application Ser. No. 13/247,964 filed on Sep. 28, 2011 (issued as U.S. Pat. No. 8,868,535 on Oct. 21, 2014),
  wherein U.S. patent application Ser. No. 13/247,964 is a Continuation-In-Part claiming the benefit of co-pending U.S. patent application Ser. No. 12/785,122, filed on May 21, 2010 (issued as U.S. Pat. No. 8,386,456 on Feb. 26, 2013),
  wherein U.S. patent application Ser. No. 12/785,122 is a Continuation-In-Part claiming the benefit of co-pending U.S. patent application Ser. No. 12/778,228, filed on May 12, 2010 (issued as U.S. Pat. No. 8,239,229 on Aug. 7, 2012),
  wherein U.S. patent application Ser. No. 12/778,228 is a Continuation-In-Part claiming the benefit of co-pending U.S. patent application Ser. No. 12/764,934, filed on Apr. 21, 2010 (issued as U.S. Pat. No. 8,676,667 on Mar. 18, 2014);
  all of which are incorporated herein in their entireties.

FIELD OF THE INVENTION

The present invention relates generally to an Internet search engine optimizer method and system. More particularly, the present invention relates to an interface product that works independently and in parallel with a browser client and search engine supercomputer server architecture that gathers, analyzes, and distills interactive input. The optimizer transforms the input into a human knowledge search pattern with informatics set theory interpretations of natural variants comprising of key featured associations and transitives that gain factor the value of the content and attenuate the confounding variables in order to stabilize and reduce sensitivity parameter variations due to the environment. For each search pattern the optimizer continuously maintains and updates preprocessed best-fit responses.

BACKGROUND OF THE INVENTION

The limitations, drawbacks and/or disadvantages of technologies are as follows: Search engines are based on Boolean algebra eigenvector algorithms that are used to parse and filter information indices until the top page ranks are determined and displayed to the end user. Unfortunately, some specific keywords combinations may be too narrow and confound a search by hiding optimal results. Search engines are predominately configured to perform static search patterns. Each search is processed from the ground up without taking into account many requests belonging to one reply. A session consists of consecutive related and unrelated search requests to reach the final destination.

The Hive

The Internet searchable environment or (U) can be construed as a complex network with billions of web pages. The Search engine supercomputer analyzes each web page, and then uses eigenvectors to determine the highest ranked pages from the end user's match criteria.

The Hive relates to a system of computers linked into a neural simulation network, the simulation network, which comprises a hive of relatively inexpensive, smaller computers, interlinked as a hierarchy and including parent and junction point simulation computers and, respectively, dedicated computers for performing specific tasks and other computers to provide processing power and still others at the peak of the command hierarchy to synchronize and delegate tasks among the various interlinked simulation computers with continuous automatic reevaluation and redirection in real time as taught in U.S. Pat. No. 6,614,893 (a parent of this application and incorporated herein by reference) for a telecom network.

Set theory by definition is the branch of mathematical logic that studies sets, which informally are collections of objects, fuzzy set theory or simply fuzzy logic to those in the field. In set theory an object is either a member of a set or not. In fuzzy set theory this condition was relaxed so an object has a degree of membership in a set, a number between 0 and 1. Algebra of set defines the properties and laws of sets is the set-theoretic analogue of the algebra of numbers just as arithmetic addition and multiplication are associative and commutative, so are set union and intersection; just as the arithmetic relation less than or equal is reflexive, anti symmetric and transitive, so is the set relation of subset. Thus U.S. Pat. No. 6,614,893 (a parent of this application and incorporated herein by reference) teaches the billing rate is estimated from the moment the call is initiated, and the accuracy of the estimate increases as the call progresses so that billing takes place in real time. This billing method is known as a fuzzy system because it takes partial data samples and continuously projects an estimated total in real time. The more data exchanged through system messages that is through chaining, the more accurate the extrapolation becomes, until it reaches one hundred percent accuracy. The interactive simulation creates a data warehouse virtual environment.

The Hive relates to a system of computers linked into a neural network which continuously scans and gathers information from, understands, and interacts with, an environment, a system of computers linked to form a neural network is disclosed, including a hive made up of a hierarchy of interlinked individual computers functioning as a unit, the hierarchy including dedicated computers which perform certain specific tasks, processing computers which provide processing power to the unified hive, and parent computers at the peak of the command hierarchy which synchronize and delegate tasks among the other interlinked computers and while providing continuous and automatic reevaluation and redirection in real time. The interlinking of the computers making up The Hive permits execution of strategies pre-set by the user and also permits user updating and changing of the strategies as new information becomes available. The synergistic interlinking of these several computers multiplies processing power to a level many magnitudes greater than that of a single computer running as taught in U.S. Pat. No. 7,058,601 for a generic network.

The Hive An apparatus for performing the method is also provided, including a computer hive made up of a plurality of inter-linked computer devices having specialized functions, the computers operating in unison to create a supercomputer having shared disk space and memory, in which each node belongs to the collective and possesses its own business rules and membership to an organization managerial hierarchy. The computer hive preferably includes multiple tiers of computer clusters, including:

(1) a software tier in which each subscriber has its own unique club member identification which is unique to the hive;

(2) an IP tier in which multiple IP servers allocate resources to the end users to enable the end users to receive live music and to interact in a virtual environment; and (3) a billing and control tier through which the computer hive validates requests, performs live billing, and controls of all of the interactions the subscribers receive as taught in U.S. Patent Application Ser. No. 60/193,260 (a parent of this application and incorporated herein by reference) for IP server hosts.

Virtual maestro based on U.S. patent application Ser. No. 09/819,174 (a parent of this application and incorporated herein by reference) is a product of artificial intelligence, since it would be impractical to provide a real person to process personal selections for each and every subscriber. The virtual maestro is represented by a virtual image, either of Beethoven or Mozart, in the virtual concert hall and will play specific song or video requests of an individual subscriber, on a pay per view basis. Alternatively, the maestro will select a series of songs of videos according to the profile stored for the individual subscriber. The profile is assembled from information the subscriber provides to become a subscriber and from a history of selections made by the subscriber through the system, and the profile is in effect how the particular subscriber is clothed in the virtual world. The payments by the subscriber for selections through the maestro are higher than for selections played for a mass of subscribers by the disk jockey, because the maestro selections are made for the particular individual.

The Hive added new functionalities based on U.S. patent application Ser. No. 11/085,678 (of which this application claims priority) to allow secure firewall partitions perform encrypted peer to peer (P2P) transactions as follows:

(4) A Total Quality Management (TQM) tier, also referred as Informational Portal, including means for enabling supplier regulation of public and private area privileges, and regulation of advertising delivery system content distribution. The TQM tier gathers information with regard to selection of works and merchandise purchased by each member. This information is used, in part, to customize the advertising displayed for the particular member during the purchase of merchandise, playing of specific works, and financial transactions.

(5) A Spyware tier, also referred as SNOOP, a mechanism that scans the interaction with the supplier system and interacts with the client software to help insure proper identification of the person's age and location at all times. When an end users requests to use the supplier system, SNOOP verifies that the latest version of the programs and resources are made available. This program will prohibit the access to system to those that are unlicensed.

(6) Command and Control tier, also referred as Command Center, is the brain of the system, processing the information of the environment into a lingua franca and then, based on defined business rules, sets forth criteria, resource allocation and task priorities, so that subsystems can work at maximum effectiveness and efficiency as a direct result of having a clear understanding of the environment. Upon receiving a final Billing Entity, the Command Centre distributes credits, funds, licensing and royalties, to the appropriate parties.

(7) A Security tier, also referred as Crusader Technology, defining computer software comprised of a hybrid firewall system which filters out unlicensed P2P transactions, blocks potentially pirated downloads, and interacts with a supplier system to offer a consumer the best quality, product and service, along with a comprehensive array of available shipping methods. By communicating, controlling, displaying, encrypting, managing, rendering, transferring, validating and verifying, interaction with the supplier system, Crusader Technology is able to customize, update and profile the end user by utilizing an Artificial Intelligence Point of Sale Application referred to as virtual "Customer Service Representative (CSR).

(8) An Advertising tier, also referred as Media Prophet, allows Corporations to specify distinct areas of coverage, or billing the exact territorial franchise store by ANI range, IP Address or Zip Code. Based on the end user's willingness to give information the system will negotiate the best value and then verifies that the individual has consented and has giving them the up to date credits for displaying and rendering of the advertisement they want to view. This is performed by taking into account uniqueness, demographics, and frequency or usage of advertisement with a monthly and yearly period.

(9) an Anti Malware tier, also referred as Phoenix Countermeasures, consists of an independent set of nodes that analyze the known traffic and determine patterns of behaviors to filter out copyrighted materials from the ocean of files transmitted over the Internet. This software is also responsible for killing P2P file transfers that are uploading/downloading unlicensed files. This program is responsible to modifying and updating SNOOP search patterns.

"Spaghetti of the environment" is similarly same to those in the field to spaghetti code "is a pejorative phrase for source code that has a complex and tangled control structure, especially one using many GOTO statements, exceptions, threads, or other unstructured branching constructs. "Spaghetti of the environment" is named such because program flow is conceptually like a bowl of spaghetti, i.e. twisted and tangled. Spaghetti code can be caused by several factors, such as continuous modifications by several people over a long life cycle. Structured programming greatly decreases the incidence of spaghetti code.

Removing the "spaghetti phenomena" is similarly same to those in the field to code refactoring and when applied to the Internet to finding independence resources after performing a normalization process that attenuates dependent and low quality links.

UCommerce is similarly same to those in the field to a universal shopping cart as per Ser. No. 10/852,394 XCommerce, as defined in U.S. Pat. No. 7,809,659 converts the massive amounts of electronic information of the Internet by transforming the content into basic language business blocks and then stores its mathematical values into Environmental Bitmaps Data Structures, so that Inventory Control Systems can quantify, qualify and match/merge the best satisfying results of an end user KEYWORD request, whereas Codex is similarly same to those in the field as knowledge and customer satisfaction inventory control encyclopedia of human ideas.

The LATIN is similarly same to those in the field to standardize each message into a lingua franca using a Hungarian notation so that all the machines can communicate amongst themselves without having to spend resources doing translations and then using business rules create a Vector CDR that is a single version of truth taking into account costs, and exact path.

Rules of semantics to those in the field is similar to Rules of language "is typically said to be governed by a group of unspoken rules: phonological, semantic, syntactic, pragmatic, prosodic, and idiosyncratic. These rules shape the way language is written, spoken, and interpreted. People create communication, not languages, phrases, or letters." (C) 2016 en.wikipedia.org All Rights Reserved. U.S. Pat. No. 7,809,659 in particular teaches: The process of improving the Informational Certainty begins by filtering the KEYWORD search by reading, comparing validating the semantic structure of the content of the all the responses and not just the highest page ranks. The supplier system measures the value of the content by comparing the quantity and quality of Simple Joins, Blocks. Ceiling and Walls, which are another name for collections of words and grammatical rules that are used to write properly in a given language.

Deductive Reasoning approach that is a clever and more intuitive criminal investigation means that mimics Sherlock Holmes case solving techniques. A language based search engine optimizer must use as point of reference a lingua franca that is mathematical and simultaneously integrates a particular language, personal, geospatial, time and corporate information. Whereas Inductive Reasoning measures popularity scores to solve for a solution.

X_FOB is similarly same to those in the field, as requesting FOB pricing using a time dimension (X) expressed in days, whereas Y_CDIF offers door to door services including customs and duties for mission critical item using time dimension (Y) express in hours.

Z_PRICE to those in the field, once the shopping cart server has performed multiple calculations the optimal solution with "the price" is displayed to the computing device, wherein the computing device can be at least one of: the end user computer terminal, computing device and or smart device, and the like.

W_RANK to those in the field teaches a search pattern that maps optimal answers to the end user. W_RANK can be static for assisted input or dynamic when simulating an end user randomly surfing the web to find the final destination. The mathematical field of topology allows the creation of dynamic pattern using set theory rules of association, transitivity, and the combining with fuzzy logic each entity is given relevancy and likelihood value.

A Cherry Picking process to those in the field can be defined by limitations taught in claim 1 of U.S. patent application Ser. No. 12/146,420, filed on Jun. 25, 2008 (issued as U.S. Pat. No. 7,908,263 on Mar. 11, 2011), which states: (A) deciphering and solving an optimal search pattern mathematical equation using deductive reasoning, (B) translating the end user's language based request into a single search pattern equation, (C) obtaining information from any give language by using math in lieu of linguistics and (D) consolidating all related and significant requests into a resultant environment that contains all of the relevant and corresponding dynamic and improved hierarchical set to create an outcome optimal hierarchical sets.

The CORE List or Codex Encyclopedia, to those in the field, can be defined by limitations taught in claim 2 of U.S. patent application Ser. No. 12/146,420, filed on Jun. 25, 2008 (issued as U.S. Pat. No. 7,908,263 on Mar. 11, 2011), which states: determining based on the quality of the keyword combination of the managerial hierarchical partition exists in the search pattern database, and thus having readily available and pre-processed the optimal response, requiring no further calculations, bypassing the usage of existing search engine capabilities.

The Hive performs the following:

(A) Transforms Data: cleans, standardizes and organizes the spaghetti of the environment by organizing the information into managerial hierarchy structure.

(B) Remove chaos and anarchy: Once the 'spaghetti of the environment' is eliminated creates command messages that are also known as Summary Reports that coordinate and synchronize each node to operate at maximal output capacity. Each node operates without adversely affecting the network flow of data. The Hive maximizes available throughput and limits the exponential rate of growth of complexity as the size of the environment increases.

(C) Convert Requests into Ideas: Search Engines dependency on Boolean algebra use inductive reasoning popularity scores to find the top results. In contrast, The Hive using deductive reasoning to interpret interactive input as being part of an idea being formulated by both the left and the right sides of the brain. When a request is incomplete The Hive probabilistically supplies and inserts missing gaps of information.

BRIEF SUMMARY OF APPLICANT'S RELATED APPLICATIONS

Boolean algebra Search Engines use eigenvector algorithms to parse and filter information indices until the top page ranks are determined and displayed as output. Each search is processed from the ground up, analyzing the searchable environment, without taking into account multiple requests belonging to one session while randomly surfing the web.

The Hive uses the optimizer software residing in a computing device memory executing instructions based on rules of grammar and semantics to transform input into a search pattern as follows:

Relative Master Indices: keeps in existence for each search pattern a relative Master Index and continuously purifies and synchronizes the plurality of relative Master Index that permits to match/merge and then correlate the Internet's Master Index in real time.

Identify new significant content: The Optimizer continuously scans and detects the Internet searchable environment for new content with significant difference quality to update each search pattern's improved environment relative Master Index and top (n) pages as output.

Dynamically Updates Output: The Optimizer rank value is dynamically adjusted by matching independent variables and related keywords belonging to the search pattern to generate a content value. The Optimizer "cherry picks" the best content value web pages as output. The output is forward chained back to the end user's terminal and displayed.

Simulates the Entire Superset of valid Search Patterns: The Optimizer is a method and system for simulating Internet browser search capacities that cleans, standardizes, organizes, and transforms the massive amount of data into a lingua franca comprising of valid keywords, term clusters, and unique geospatial patterns contained in the Internet collectively known as patterns that exist in each page. The relative Master Index for each search pattern is stored and updated as crawlers detect significant changes in the environment.

BRIEF SUMMARY OF THE
INVENTION—RELATED APPLICATIONS

As taught in U.S. patent application Ser. No. 09/514,940—Issued as U.S. Pat. No. 7,058,601 (a parent of this application and incorporated herein by reference)

The Hive having a media value database that is in digital communication with The Hive that is searched to monetize and commercialize each transformed input and corresponding optimal output as follows:

Real time optimization and strategy execution system to function as a single unit, including at least one parent computer synchronizing and delegating tasks among the several computers; so that the unit scans and gathers data from the virtual environment, and processes and organizes the data into an implementable representation of the data.

Delivers the implementable representation of the data in the form of a report to a user computing device or computer terminal and awaits a decision from a human user.

Human Knowledge Entities: Continuously processes and filters raw data into primed data comprehensible for human monitoring and evaluation as a summary report object.

The computing device communicating to the Hive is in digital communication to search the Codex and a webpage database residing in the Codex that stores in memory the master index and the partial master index for each element of the Codex. Correct: 150 and 700 are connected and search 450 using the search pattern 329 partial master index 469, 479, 489 objects virtual environment.

Index Refined Entities analyzes and parses through news, data and information in real time to determine portions thereof having relevance to the recently primed data received.

Personalized (Dynamic) Entities executes a set of software instructions to compare the primed data to end user-defined parameters to automatically generate output.

Proactively Identifying Significant Entities: Provides data warehousing and business intelligence analysis, should the primed data be deemed relevant.

Updating End User's Terminal: Determines the information being tracked by an end user, customizing news, data and other information based upon the particular information being tracked, and automatically updating the end user with the latest trending information.

Continuous Assessment: Performs automatic reevaluation and redirection, coordinates, controls, manages, prioritizes, and synchronizes the tasks of each subordinate node. As taught in U.S. patent application Ser. No. 10/926,446—Issued as U.S. Pat. No. 7,050,813 (a parent of this application and incorporated herein by reference) Partial Differential Equation Vectors Model:

The Hive creates summarized information and builds a valid vector CDR that renders remaining CDR obsolete. The Hive environmental bitmaps are summarized information of the simulation network, used to maximize throughput, redundancy is eliminated minimizing saturation. The valid Vector CDR is a multi-variant single version of the truth Vector. The simulation network environmental bitmaps is the basis for the Summary Report object.

The Hive nodes summarize information of the simulation network. The Hive nodes stores informational certain summarize information of the current conditions of simulation network that is used to remove the spaghetti phenomena by normalizing the simulation environment. Now, the Hive transfers the exact conditions and route patterns of the entire network to each node, permitting every time a call is instantiated the creation and assignment of the necessary known resources to create an exact route.

The Hive solves solutions with two or more independent variable. The solution requires an equation with a plurality of independent variables. Thus we replace the traditional vector with Partial Differential Equation Vectors using Set Theory and then solves for the independent variables (I, J, K,), to create a billing entity and resultant vector. The node controlling Partial A functions (alternatively know as a subscriber) creates a final resultant vector that includes all the circuits.

As taught in U.S. patent application Ser. No. 10/852,394 (a parent of this application and incorporated herein by reference)

The Hive functions and characteristics are as follows:

Computer Network System: Consists of a plurality of artificial intelligence nodes, programmed to perform predefined tasks based on the current conditions of the environment.

CPU Nodes: are autonomous and in real time analyze, evaluate, gather and process information from the environment. From incipiency upon receiving the fuzzy logic piece of information that triggers a new or updated task.

Managerial Hierarchy: All nodes are configured into a managerial hierarchy, the Upper tiers control and coordinate and the Lower Tier constitutes the workhorse of the system.

Synergy: Every predefined cycle each node synchronizes the latest inventory. Nodes request siblings for any excess buffer resources to complete a task using vertical and lateral synergy. Parent nodes use their chain of command to coordinate their subordinates.

Eliminates the Spaghetti Phenomena: standardizes raw information into primed data so that Information Certainty is achieved and thus removes the Spaghetti Phenomena.

Primes Vector or Call Detail Records (CDR): Lingua franca messages or vectors contain the trajectory and all transactional segments information. Each assigned hierarchical owner plots the vector trajectory so that nodes can communicate amongst themselves via forward and reward chaining.

Avoids Taxing the Throughput: Upper nodes use environment bitmap information to control and coordinate the traffic in order to avoid taxing available throughput.

Maximal Throughput: Bitmap information permits each node via synergy to shares resources with other nodes with substantial buffer to eliminate the tax burden and waste.

Analyzes Network Traffic: Informational traffic is measured allowing nodes of each tier perform the non-obvious task synchronizing and managing their subordinates to use synergy to minimizing waste before permitting data to be transmitted through their chain of command.

Informational Certainty: Nodes remove waste at incipiency, so the computer network system can be considered a real time invention.

Stabilizes the Flow of Information: The managerial hierarchical stabilize the flow of information and allows nodes to use synergy to work as a single unit permitting the computer network to create a virtual instance of the organizational environment.

Real Time System: Once the spaghetti phenomena is eliminated, informational certainty is achieved. The system rearward chains the routing vector through the simulation network to the point of origin and analyzes and evaluates the best usage of network resources. As taught in U.S. patent application Ser. No. 11/584,941—Issued as U.S. Pat. No. 7,809,659 (a parent of this application and incorporated herein by reference)

XCommerce, is a method that simulates the entire superset of potential valid interactive input regular expression requests construed during an Internet browser search and converting the results set into a vector based statistical data that enable efficient and accurate searching. Indexing searches as follows:

Managerial Hierarchical Index Relationships: a request is broken down into keywords and clusters, and then converts them into a search pattern.

Determining what is Relevant and Irrelevant: Pages that match a Relationship Index are relevant, and those that do not are irrelevant.

The Internet environment is a super block that is partitioned into a managerial hierarchy. The primary index relationship creates blocks, then secondary index relationship creates sub blocks and, afterwards the tertiary index relationship creates mini blocks.

Identifies Static Search Patterns: The computer network system determines if the search pattern already exist and if yes sends the output to the end user.

Calculates Dynamic Search Patterns: The system uses managerial hierarchical relationship indices to create optimal size partitions and probabilistically determines a match. When a match occurs the Optimizer picks the top (n) pages with the highest values.

Finds New Search Patterns: Stores each new search patterns and top (n) pages.

Displays Top (n) pages: Sends and displays the output in an order to the end user.

As taught in U.S. patent application Ser. No. 12/146, 420—Issued as U.S. Pat. No. 7,908,263 (a parent of this application and incorporated herein by reference)

A search engine optimizer, hereinafter referred as Cholti, gathers interactive input from a browser. The optimizer reorganizes the interactive input as optimal input that is sent to the search engine, and then the output is sent to the end user. Each request is converted into a search pattern and stored as a mathematical equation that mimics the left (linguistics) and right (geospatial) side of the brain. The mathematical equation is used in lieu of linguistics.

Codex, as defined in U.S. patent application Ser. No. 12/785,122, Issued as U.S. Pat. No. 8,386,456 (a parent of this application and incorporated herein by reference), is a comprehensive collection of search patterns that are stored in a managerial hierarchical manner. The HIVE lingua franca consists of a plurality of concurrently operating block domains, and the sum of all the blocks is the Internet.

Each computing device is in digital communication to search the Codex. The webpage database residing in the Codex stores in memory the master index and the partial master index for each valid interactive input regular expression request or element of the Codex:

Lottery mathematics: Cholti, and Codex using the benefit of U.S. patent application Ser. No. 11/584,941 filed on Oct. 23, 2006 (issued as U.S. Pat. No. 7,809,659 on Oct. 5, 2010) and U.S. patent application Ser. No. 12/764,934, filed on Apr. 21, 2010 (issued as U.S. Pat. No. 8,676,667 on Mar. 18, 2014) teaches how to improve accuracy of a requests by using independent variables (I, J or K) to map and create managerial hierarchical partitions of the Internet environment such as: from top to bottom superset (I), set (I, J) and subset (I, J, K) datasets.

Hot and cold analysis: uses logic mathematics to estimate the size of the environment as the end user types interactive input.

I. Simulating the Human Brain:

Human Brain: Each linguistic Glyph is assigned to the [L] left side of the brain and each geospatial Glyph is assigned to the [R] right side of the brain and the Anchor is the best common denominator Glyph.

The dominant tendency of each request is given a [L] linguistic, and [R] geospatial tendency, and then Cholti reorganizes, maps and plots the Glyphs to create a managerial hierarchical relationship index.

Human Brain Intelligence: Transforms each search pattern and identifies independent variables based on mass partitions of the Internet and creates join, simple, hybrid, complex and optimal pyramids (layers of refinement).

Human Brain Wisdom: analyzes the top (n) pages and expands each [AX], [BX] and [CX] Glyph equation with key featured association dependent variables.

Cholti picks one of four search strategies: [LL], [LR], [RL], and [RR], which have different set of business rules to analyze the Internet and limits partitions not to exceed 1 billion or (2^30) pages and thus eliminates the principal confounding variable, which is the exponential rate of growth of the environment.

II. [L+R] Managerial Relationship Events

If the independent variable (I) is represented by the Historical Event "American Civil War" {1863}, where "American Civil War" is the left side of the brain variable (I) and 1863 is the right side of the brain (X), and are merged to a single event or superset (I!).

Gamma Functions

Cholti and Codex, using the benefit of U.S. patent application Ser. No. 11/584,941 filed on Oct. 23, 2006 (issued as U.S. Pat. No. 7,809,659 on Oct. 5, 2010) and U.S. patent application Ser. No. 12/764,934, filed on Apr. 21, 2010 (issued as U.S. Pat. No. 8,676,667 on Mar. 18, 2014), teach how to create search patterns that improve the accuracy of a request. The likely and unlikely analysis uses Gamma functions to solve for the size of the environment.

For example: the end user types 1863 American Civil War, and the Optimizer maps using [L] left side of the brain term cluster "American Civil War" and with [R] right side of the brain 1863 to create "American Civil War" (1863). The "War between the States" is also synonymous with the "American Civil War", and thus "between the" which are dependent variables since they have a mass less than 1. The Dominant Tendency and the keyword "States" which has a mass of 1+ is likely. The keywords (1861, 1862, 1864 and 1865) are unlikely.

Search Pattern Variables

Independent Variables: The IV Numbers are the control variables or independent variables that determine the circle of accuracy, which in turn limit the size of the environment.

Dependent Variables: The Dependent Variables (DV) Numbers are the observable variables or dependent variables, and are considered strong filters.

Complement Variables: The Complement Variables (CV) Numbers are the measured variables or dependent variables, and are considered weak filters.

Partial Differential Equations: When using Partial Differential Equations usually the solution is not unique due to the fluid and dynamic conditions of the search process, and ergo input combination usage behavior directly affects the size of the environment (or boundary of the region) where the solution is defined.

As taught in U.S. patent application Ser. No. 11/085,678 (a parent of this application and incorporated herein by reference)

The Valorized Optimal Advertisement maximizes customer satisfaction and measures accuracy and media value to the Corporate Sponsor.

The Shopping Cart uses the managerial hierarchical relationship index to obtain the human brain equation that contains the probabilistic weight of each valid Glyph to gain factor or attenuate advertisements decisions.

As taught in U.S. patent application Ser. No. 13/247, 964—Issued as U.S. Pat. No. 8,868,535 (a parent of this application and incorporated herein by reference)

Codex, using the benefit of U.S. patent application Ser. No. 11/584,941 filed on Oct. 23, 2006 (issued as U.S. Pat. No. 7,809,659 on Oct. 5, 2010) and U.S. patent application Ser. No. 12/764,934, filed on Apr. 21, 2010 (issued as U.S. Pat. No. 8,676,667 on Mar. 18, 2014), cleans, organizes, inventories, standardizes and mirror image of the existing Internet environment. The mirror image of the existing Internet environment is a neural network which continuously scans and gathers information from, understands, and interacts with, an environment as per U.S. patent application Ser. No. 10/603,963, filed on Jun. 25, 2003 (issued as U.S. Pat. No. 6,614,893 on Sep. 2, 2003) and U.S. patent application Ser. No. 10/603,963, filed on Jun. 25, 2003 (issued as U.S. Pat. No. 6,614,893 on Sep. 2, 2003) that is absent of the spaghetti phenomena and is organized in several layers of refinement to eliminate the exponential rate of growth the primary confounding element of the search process, and furthermore, having Vector V that is a single version of the truth that is absent of redundancy, spam and virus links.

When performing said task the system correlates the content of each paragraph, and page belonging to the same site. The system primes each paragraph, and this is when confounding data is eliminated by supplying the missing gaps of information.

In U.S. patent application Ser. No. 11/584,941 filed on Oct. 23, 2006 (issued as U.S. Pat. No. 7,809,659 on Oct. 5, 2010), Rules 118, 119 and 120 teaches a neural network how make concise, precise and optimal searches after using lexical features layers of refinement for each search pattern.

U.S. patent application Ser. No. 12/146,420, filed on Jun. 25, 2008 (issued as U.S. Pat. No. 7,908,263 on Mar. 11, 2011) teaches how a neural network mimics the human brain, and performs a comparative analysis of a plurality of requests, eliminates confounding data by supplying missing gaps of information, primes the actual content of the optimal environment paragraph by paragraph to elucidate the best fitting content recommendation.

U.S. patent application Ser. No. 11/584,941 filed on Oct. 23, 2006 (issued as U.S. Pat. No. 7,809,659 on Oct. 5, 2010), U.S. patent application Ser. No. 12/146,420, filed on Jun. 25, 2008 (issued as U.S. Pat. No. 7,908,263 on Mar. 11, 2011) and '535 combined teach the following:

| TIER 1 | Join Pyramid | 1,000,000,000 pages | 50%-60% accuracy | [[Vague Search]] |
|---|---|---|---|---|
| TIER 2 | Simple Pyramid | 1,000,000 pages | 61%-85% accuracy | [[Concise Search]] |
| TIER 3 | Hybrid Pyramid | 10,000 pages | 86%-95% accuracy | [[Precise Search]] |
| TIER 4 | Complex Pyramid | 100 pages | 96%-99% accuracy | [[Optimal Search]] |
| TIER 5 | Optimal Pyramid | Final destination | 100% accuracy | [[Direct Search]] |

When referring to the final destination: The global, regional and local scope may differ. For example: a (local) map may be valid, the (global) home page of the company and an (global) encyclopedia definition or (regional, local) news item; nevertheless if a checkmate combination is found, the user's intent is known.

As taught in U.S. patent application Ser. No. 13/777, 775—Issued as U.S. Pat. No. 8,977,621 (a parent of this application and incorporated herein by reference)

I. Build the Summary Report Objects

A. The Hive neural network simulates the entire superset of valid interactive input regular expression construed during an Internet browser search and then organizes and distributes the searchable environment using at least one index relationship, and then hierarchically creates a chain of command comprising of super blocks, blocks, sub blocks, mini blocks and elements. The entire managerial hierarchical chain of command is index refined, wherein each position probabilistically maps an improved environment with a corresponding partial master index that ranks in order of value from highest to lowest each site and web page.

Transform Interactive Input into Search Patterns

B. Assigning to each unit (or position) of the chain of command a search pattern.

C. Storing each valid search pattern into the 'CORE List' database.

D. Setting a vector value to search pattern based on estimated environment size and the partitioning the interactive input into keywords and clusters that are transformed into Glyphs.

Transform input keywords and clusters into a Glyphs (vector) based search patterns. Assign a vector value to each Glyph depending if they are independent, dependent or complement variables. Independent variables are synonymous with index relationships.

Create the Improved Environments

E. Each position of the chain of command is a partition of the Internet searchable environment and can be referenced from the 'CORE List' using index relationships. The index relationships of each search pattern are used to create an improved environment.

F. For each element of the 'CORE List' statistically normalize and data integrate each site and web pages belonging to each improved environment into a partial master index.

Likelihood Analysis

G. Measures inductively each element of the 'CORE List' using the Likelihood Analysis applying associative and transitive relationships to synthesize linguistic and geospatial information key featured associations. The key featured associations and transitives are dependent and complement variables gain factor the vector value of each page.

Relevancy Analysis

H. Measures deductively each element of the 'CORE List' using the Relevancy Analysis applying rules of association and transitivity to identify confounding variables. Assign to each unit object a feedback equation that attenuates content with confounding variables in order to stabilize and reduces sensitivity parameter variations due to the environment.

Storing and Updating the CORE List

The Hive Stores the latest top (n) results or the summary report in the 'CORE List' database as follows:

First when Interactive Input:

A. Identify each keyword and cluster interactively belonging to the input and immediately convert input into index relationships.

B. Query the 'CORE List' to map the most probable position (or unit object).

C. Display to end user the estimated environment size of the input and the improved environment size using the most probable position (or unit object).

(i) Static Output: Determine if the most probable position contains the final destination and, if yes, then displays the summary report object to the end user. The output is readily available and preprocessed no further calculations are required.

(ii) Dynamic Output: Obtains the key featured association and transitives and feedback equation of the most probable position (or unit object) and correlate the results. Set a vector value to each page, using the hot algorithm to gain factor key featured association and transitives and the cold algorithm to attenuates the vector value of each page.

D. Displays top (n) pages: Sends and displays the output in an order to the end user.

Second when Assisted Input:

A. Identify each keyword interactively and offer Assisted Input command instruction to the end user. Each Assisted input maps the index relationship belonging to a unit object.

B. Obtain decision from end user and the selected unit object from 'CORE List'

C. Display to end user the selected assisted input from the 'CORE List'

Third when Smart Input:

A. Obtain the right side of the brain check mate combination Global Positioning System (GPS) coordinates and identify the commercial Glyph of the interactive input. Then transform the commercial Glyph and GPS coordinates into smart input and derive the index relationship that maps a unit object.

B. Query the 'CORE List' to map the most probable position.

C. Display the 'CORE List' optimal output based on GPS coordinates.

D. Determine if a valid static output exist. If yes, the output is readily available and no further calculations are required. If no create the Dynamic Output and display Fourth when Personal Input:

A. Identify interactive, assisted and smart input and convert input into an index relationship that maps a position (or unit object).

B. Query the 'CORE List' to map the most probable position.

C. Offer a Personal Input list of command instruction to the end user. Each element of the list is obtained by performing the Hot/Cold analysis of the most probable position.

D. Obtain Personal input decisions from end user.

E. Interactively display to end user the input and corresponding optimal output.

F. Once the confounding variables are eliminated display the final destination.

Improved Environment: A search pattern indexes the searchable environment using index relationships to create an improved environment. The primary index relationship picks a relevant environment that is built using a reverse chaining algorithm to map between 1 and 2 billion pages. For example: Animal would include vertebrate or invertebrate, mammals or birds.

For example, when Tiger is selected at least one relevant environment is available, first is Animal relevant environment, another is the Military relevant environment, and finally the Sports relevant environment. Animal is [LL], Military is [LR], and Sports [RR] search patterns. Why do you ask? Well, [LL] is Tiger that is an animal, whereas [LR] is a tank that was used in WWII (1939-1945), whereas [RL] Detroit Tigers is a commercial Glyph or smart input that contains a right brain checkmate. Nevertheless, each unit objects of Tiger yield an improved environment, since each valid unit object is considered its own environment. Each improved environment has a partial master index that maps each page and site with a value.

Optimal Solution: Once a search pattern yields the final destination, the human brain has a left side and right side checkmate combination and thus a direct search.

As taught in U.S. patent application Ser. No. 14/013,018 (a parent of this application and incorporated herein by reference)

Direct Searches

Interactively discovers command instructions that eliminate confounding variables to modify the search pattern in accordance with the instructions from the end user that creates a direct search or personal input that automatically yields the final destination.

Online Purchasing System

The Shopping cart, a computing device software application, performs advertisement, financial resource management, inventory control and online purchasing in real-time facilitating the ads and logistical distribution of door-to-door goods using a chosen shipping method.

X_FOB Method for the Internet

The X_FOB method furnishes free content, offers paid content using the proceeds derived from Advertisements, and makes paid downloadable product available upon the checkout command instruction is received.

Y_CDIF Method

The Y_CDIF method finds the best Price per Unit (P/U) product, whereas Rush adds time as a dimension for figuring out the optimal inventory delivered door to door.

Advertisement Method

The Advertisement Module offers sponsored command instructions comprising targeted links and target Automatic Number Identification (ANI) prioritized using supply side economics (bids) to the end user and compensates them for watching or sharing their information to purchase licensed P2P audio and video works. Furthermore, displays valorized optimal advertisements to consent the sharing of information with corporate sponsor and receive credits to purchase audio and video works.

As taught in U.S. patent application Ser. No. 14/028,508 (a parent of this application and incorporated herein by reference)

Informatics Set Theory Constructs Based on Semantics and Human Knowledge

Core List Elements Rules

Before doing any calculations, existing inductive reasoning search engines partition the Internet based on language and then subdivide and optimize based on country. For example: English+USA, English+UK and English+Australia to name a few.

Rule 1: Searchable Environment: Deriving zero index relationships and using the Internet (U) as the environment and ranking each web page to the master index. Therefore, each page belonging to Internet environment is normalized and probabilistically ranked.

Rule 2: Improved Environment: Deriving one index relationship and subdividing the Internet using primary index relationships to create a Block (I) that maps an improved environment eliminating from calculation any page not belonging to block (I). For example: "AMERICAN CIVIL WAR" as English language, "APPLE" as mixed, and "USA" as geospatial.

Rule 3: Optimal Environment: Deriving two index relationships and subdividing the Internet using primary and secondary index relationships to create a sub block (I, J) that maps an optimal environment eliminating from calculation any page not belonging to sub block (I, J). For example: USA+FLORIDA, "AMERICAN CIVIL WAR"+ROBERT E. LEE, GERMAN+TIGER TANK, APPLE+MCINTOSH (mixed) or APPLE FLAVOR+SYRUP (language).

Rule 4: Optimal Dataset: Deriving three index relationship and subdividing the Internet using primary, secondary and tertiary index relationships to create a mini block (I, J, K) that maps an optimal dataset eliminating from calculation any page not belonging to mini block (I, J, K); For example: USA+FLORIDA+MIAMI or TIGER TANK+BATTLE OF KURSK 1943, GENERAL {ROBERT E. LEE}+"AMERICAN CIVIL WAR" {BATTLE OF GETTYSBURG}

Rule 5: Partial Master Indices: Ranking for each partition each web page to a relative master index. For example: each Super Block relevant environment ranks 1 billion pages, each Block (I) improved environment 1 million pages, each Sub Block (I, J) optimal environment ranks 10,000 pages, and each Mini Block (I, J, K) optimal environment ranks 100 pages. Combining with U.S. patent application Ser. No. 11/584,941 filed on Oct. 23, 2006 (issued as U.S. Pat. No. 7,809,659 on Oct. 5, 2010) which teaches a Super Block is a join layer of refinement, Block (I) is an Simple layer of refinement, a Sub Block (I, J) a Hybrid layer of refinement and Mini Block (I, J) is a complex layer of refinement, and Final Destination is an Answer layer of refinement.

Rule 6: Grouping of Concepts: Binding and mapping the block (I) into the Internet environment (U), the Sub Block (I, J) into the Block (I), and the Mini Block (I, J, K) into the Sub Block (I, J). Partitioning the Internet into a plurality of languages such as English, French, Spanish, Chinese, Japanese, Russian, etc. to execute the grouping of concepts using the corresponding rules of semantics and grammar of the specific language Internet (U).

Rule 7: Managerial Hierarchy of Concepts: Hierarchically subordinating each relative master index to their parent the relative master index and also subordinating the chain of command to the master index. Each page belonging to a Block (I) belongs to their parent Super Block (U) that belongs to their specific language Internet (U). In a first example: Managerial hierarchy of concepts is Dogs (I)→Animals (U)→English Internet (U). In a second example: Chihuahua (I, J)→Dogs (I)→Animals (U)→English Internet, and Chihuahua Images (I, J, K) or Chihuahua Videos (I, J, K) are subordinate to Chihuahua (I, J). Where the keywords Images and Videos are associations.

Rule 8: Geospatial partition: Each Block (I) is a geographic area. For example: USA (I)→North America (U)→World (U) and (North Miami Beach|33160) (I, J, K)→Florida (I, J)→USA (I) used for smart input. Geospatial partitions are [R] right side of the brain checkmate combinations.

In an example, let us suppose that we wanted to organize all human laws and store all of them in a single site, including a total of 64 million documents in multiple languages and belonging to a plurality of countries; each having exactly 1 million documents. The first step would be to subdivide based on category, in this case language, thus the Superblock of laws, would be categorized based on language and further subcategorized by country. Thus, English+USA, French+Canada, and Spanish+Mexico would be valid with 1 million documents each.

For example, now, we want to further optimize the English+USA side of the site, by organizing the documents into a managerial hierarchy using geospatial independent variables (I, J, K); where (I) represents USA and all federal laws; (J) represents state laws, such as California, Florida, Georgia and New York; and (K) represent local laws such Los Angeles, Miami, Atlanta, and Brooklyn. At this point a user could use his Managerial hierarchy of concepts to perform the following searches: FIRST: "FS" is translated into (I, J) or (USA, FLORIDA) for Florida Statutes. SECOND: The user adds the keyword "718" that is translated into Condominium law. THIRD: The user edits the request to FS 718.504 that translates to the prospectus section, and then after reading the content further refines the search to FS 718.506 1(d) that translates to the statutes of limitations of publication of false and misleading information that responds with the optimal output: "Under no circumstances shall a cause of action created or recognized under this section survive for a period of more than five (5) years after the closing of the transaction".

The State of Florida legislature organized the Florida Statues into a Managerial hierarchy of concepts. In this case FS is the block, 718 is the sub block, 718.506 or 718.504 are mini blocks, and 718.506 1(d) is an exact element. Other examples, including the bible and large volume encyclopedias are organized in a Managerial hierarchy of concepts for quick reference.

Static Analysis Rules

Rule 9: Human Concepts (or Glyphs from U.S. patent application Ser. No. 12/146,420, filed on Jun. 25, 2008 (issued as U.S. Pat. No. 7,908,263 on Mar. 11, 2011)): Identifying a [L] left brain linguistic based checkmate combination when three (3) directly related linguistic index relationships (I, J, K) exist. In a first example: (1) "AMERICAN CIVIL WAR" (2) Add Robert E. Lee (3) Add Gettysburg. (1-3) become Historical Event {BATTLE OF GETTYSBURG}+General {Robert E. Lee}. (1) has (I), (2) has (J) and (1-3) have (I, J, K). In a second example: The Human Concept Gettysburg is not used for GPS coordinates (smart input), but instead for the American Civil War battle that occurred Jul. 1, 1863 through Jul. 3, 1863.

Rule 10: Geospatial Data: Analyzing using [R] right side of the brain to map and plot each recognized geospatial independent variables glyphs into index relationships and then establishing the primary filter as the primary index relationship (X), the secondary filter as the second index relationship (Y), and the tertiary filter as the third index relationship or (Z). For example: 33160 automatically becomes USA (X)+FL (Y)+(33160 North Miami Beach) (Z).

Rule 11: Vector Addition: Adding the vector value of each index relationship into a resultant geospatial vector value that determines the significance level. For example: The vector value of (USA, FL, North Miami Beach, 33160) is a precise search with 10,000 web pages. Still vague unless you search for information with regards to the City of North Miami Beach.

Rule 12: Geospatial Vector Addition: Using the resultant geospatial vector value to determine the smallest partition of the Internet that will serves as point of origin for the search process. For example: Vector (USA, FL, North Miami Beach, 33160) or (x, y, z, w) is a subset of the visible environment (USA, FL) with 1,000,000 reasonable pages, that creates an improved environment with 10,000 probable pages, eliminating from calculation any page that is not close the GPS coordinates of the center point of the zip code. After a geospatial vector addition a map is rendered and displayed from the zip code center or computing device GPS coordinates.

Rule 13: Hot and Cold Algorithm (or Usage Pattern of Behavior): Relevant keywords and concepts become independent variables, and attenuate irrelevant keywords and concepts when solving the final equation. In a first example: Battle of Gettysburg, maps "American Civil War USA Pennsylvania Gettysburg July 1863" keywords as independent variables, and attenuates 1861, 1862, 1864 and 1865, and States such as Florida Texas, and events such as Shiloh and Antietam that knowledge of the facts makes them irrelevant.

Rule 14: Plotting Geospatial Vectors: Comparing the resultant geospatial vector value against mass limits to determine how many linguistic index relationships exist. In another example: When the user types or says the keyword WALMART the input becomes a smart input that transforms the keyword WALMART into a commercial concept and uses the computing device GPS (X, Y, Z, W) components to create an optimal search with four (4) independent variables. The input is transformed into the commercial concept (or Glyph) WALMART that is a concise search, and is improved when plotting the geospatial vector USA (X)+FL (Y) to become a precise search, and is further refined when plotting the geospatial vector City (Z) and Zip Code (W) to become an optimal search.

Rule 15: Master Index: Deriving no index relationships and using the Internet (U) as the environment and ranking each web page. For example: The master index maps each valid page for each language environment and ranks each page using a popularity probability.

Rule 16: Partitioning: Deriving a one (1) index relationship and subdividing the Internet using primary index relationship to create a block (X) as the relevant environment and attenuating from calculation any page not belonging to block (X). For example: User types France this eliminates from calculation any page that does not make reference to the keyword France (X).

Rule 17: Sub partitioning: Deriving a two (2) index relationship and subdividing the Internet using primary and secondary index relationship to create a sub block (I, J) and attenuating from calculation any page not belonging to sub block (X, Y). For example: When the two related independent variables "AMERICAN CIVIL WAR" (I) and "GENERAL ROBERT E. LEE" (J) are joined to make a precise search comprising of Set (I, J) with 10,000 probable pages.

Rule 18: Index Refinement: Deriving a three (3) index relationship and subdividing the Internet using primary, secondary and tertiary index relationships to create a mini block (I, J, K) as the visible environment and attenuating from calculation any web page not belonging to mini block (X, Y, Z). For example: When the three related independent variables: "AMERICAN CIVIL WAR" (I), "GENERAL ROBERT E. LEE" (J), and "GETTYSBURG" (K) are join together to create a search pattern, the geospatial keywords {USA, PA, Gettysburg} and the Date: Jul. 1-3, 1863 are use to gain factor pages in the analysis as being superior. Furthermore, U.S. patent application Ser. No. 12/764,934, filed on Apr. 21, 2010 (issued as U.S. Pat. No. 8,676,667 on Mar. 18, 2014) teaches Index Refinement up to the respective (nth) level index relationship.

Dynamic Analysis Rules

Rule 19: Substitution: Substituting (I) when null with (X), substituting (J) when null with (Y), substituting (K) when null with (Z); For example: the end user types "33160" is transformed into a smart input, where (I) becomes "USA", (J) becomes "FLORIDA", and (K) becomes 33160 Aventura. A concept category may substitute (I) and also sub category (J) when null.

Rule 20: Smart Input: Identifying [R] right brain checkmate combinations when three index relationships or GPS (X, Y, Z) coordinates exists. For example: The computing device converts a "WALMART" search pattern into smart Input, by adding the GPS (X, Y, Z) coordinates of the computing device, and the WALMART input becomes WALMART (USA, FL, Aventura, 33160) or WALMART "render map with parameters" (USA, FL, Aventura, 33160).

Rule 21: Smart Search: Performing deductive reasoning by adding the index relationships of [LR] both sides of the brain to create a resultant equation vector value that determines the significance level. For example: input WALMART (USA, FL, Aventura, 33160) has four independent variables first "WALMART", second USA+FL, third City of Aventura and fourth Zip Code 33160, and the GPS (X, Y, Z) coordinates of the computing device are parameters to render a map.

Rule 22: Smart Partitions: Using the resultant equation vector value to determine the smallest partition of the Internet that will serves as point of origin for the search process. For example: input WALMART (USA, FL, Aventura, 33160) has a smart partition comprising of all the valid pages that are located within X miles of the end user's computing device GPS (X, Y, Z) coordinates.

Rule 23: Category: Assigning each index relationship to concept (or Glyphs) relevant to the search category. For example: Input WALMART (USA, FL, Aventura, 33160). The category for "WALMART" is a commercial concept (or glyph) that yields direct sales via www.walmart.com, or by directing the user to the store addresses closest to their present computing device latitude and longitude coordinates. "WALMART" based on the encyclopedia human knowledge category is also related to its competitors "TARGET", "KMART", "TOYS ARE US", "BEST BUY" and "WALGREENS", which are also commercial concepts (or Glyphs).

Rule 24: Rule of Relevancy: Identifying the most relevant codex pages based on the index relationship and to obtain top (n) web pages of each category and their optimal inventory control data structure containing "related objects". For example: "WALMART" becomes the commercial Glyph for the multinational store chain of supermarkets, and the human knowledge encyclopedia with display as output corporate information, mapping for computing devices, news, and www.walmart.com in order to be able to purchase online or get customer support, in addition offer related searches. Rules of relevancy are what discover key featured associations.

Rule 25: Human Knowledge Related Concepts: Analyzing the related objects to find missing gaps of information. For example: When searching a Summary Report object displays the optimal dataset of a specific search pattern, whereas the related searches are similar objects that are trending or have similarly same characteristics, that might attract the end user's attention. Leonardo Di Vinci, will have as related searches Michelangelo, and Rafael Sanzio maestros, and the master pieces of Mona Lisa and the Last Supper paintings to name a few.

Rule 26: Events: Matching, mapping and mixing pair combinations of two categories against each other in order to determine direct relationships and relevancy between two (2) categories.

Rule 27: Hot Algorithm: Emphasizing high probability categories combinations associated to the mathematical equation that yields the final destination.

Rule 28: Cold Algorithm: De-emphasizing low probability categories combinations associated to the mathematical equation that yields the final destination.

Rule 29: Assisted Search: Integrating index relationships (I) and (X) into event (I!) and deriving the index relationships using the event (I!) to create element (I, J, K).

Rule 30: Smart Search: Integrating index relationship (J) and (Y) into event (J!) and deriving the index relationships using the event (J!) to create element (I, J, K) and Rule 31: Direct Search: Identifying [LR] left and right brain checkmate combinations when six index relationships or (I, J, K, X, Y, Z) exists.

Index Refine Rules

Rule 32: Normalizing Content: Reading and confirming the content of top ranked valued (n) responses belonging to the optimal sized environment. For example: Once a new element to the encyclopedia's chain of command is created, each page is thoroughly analyzed.

Rule 33: Inventorying Content: Validating the best responses based on content value. For example: Thorough analysis elucidates the page with the highest relevant content;

Rule 34: Organizing Knowledge: Selecting the best fit element subdivision to create the optimal sized environment. For example: When creating new elements to the chain of command picking the search pattern with the highest information certainty and thus accuracy.

Rule 35: Cherry Picking: Picking the best fit content and top ranked valued (n) responses as output. For example: Selecting the Summary Report containing the optimal dataset.

Rule 36: Arranging Output: Sending and displaying output to a user's terminal. For example: The output is sent to the end user's console device arranged in an order (highest first).

Renew Indices Rules

Rule 37: Respective (nth) Level Purification: Simulating for each codex page the optimal environment in real time and assigning a relative master index. For example: Each summary report object indexes the preprocessed optimal output comprising of the top (n) pages.

Rule 38: Respective (nth) Level Synchronizing: Continuously scanning the environment and updating each codex page as each new web page is identified having a higher value than the lowest value stored web pages; associate the new web page to the codex page; disassociate the lowest valued web page to the codex page; storing and updating changes in real time to the codex pages. For example: The content of the encyclopedia is updated in real time as significant new documents are detected, in order to ensure that each preprocessed optimal output has the latest information. This was a key reason for the invention.

Rule 39: Real Time Encyclopedia (Linguistic Word Pattern from U.S. patent application Ser. No. 11/584,941 filed on Oct. 23, 2006 (issued as U.S. Pat. No. 7,809,659 on Oct. 5, 2010)): Continuously storing and updating in real time the at least one collection of top (n) web pages, and the top (n) sites geospatial information. For example: In order to bypass the search engine capacities once the optimal output for a search pattern changes, it must immediately update a summary report object with the latest information in the Encyclopedia database.

Rule 40: Respective (nth) Level Optimizing: Continuously storing and updating in real time relative master index belonging to each codex page. For example: Once optimal dataset changes the relative master index is updated in real time.

New Master Indices Rules

Rule 41: Master Index Scheduling: Determining at predefined time intervals the total number of web pages in the codex and for each codex page in its chain of command. For example: The system continuously verifies the entire content of the Internet, in particular when a new master index is created. Once the new master index assigns new probabilities to each document, the entire chain of command is analyzed in order to determine if the optimal dataset changed.

Rule 42: Master Index Synchronization: Determining at predefined time intervals the total number of significant difference changes in the Internet and then revaluing each site that updated one of its top ranked (n) web pages. For example: Real time verifying of significant changes to the content of the Internet, once new content triggers the creation of a new partial master index. Once the new significant difference documents not existing in the master index are incorporated, the entire chain of command is analyzed in order to determine if the optimal output changed.

Rule 43: Master Index Trending: Purifying, mapping and plotting each element of the old master index into the new master index using the content value of the relative master index of the highest vector valued codex page. For example: Once the system scans, gathers, trends and updates the latest significant difference changes of the Internet, the old master index is transformed into a new master index reflecting the current conditions.

Rule 44: Master Index Renewal: Continuously creating, storing, synchronizing and updating in real time the new master index that reflect the latest condition of the environment that is derived from the continuously detected significant changes and adjustments made to the codex. For example: Change in the Internet environment is a constant.

Rule 45: Real time Master Index: Purifying, transforming and updating new master index and in turn the codex and the entire chain of command of codex pages.

Variance Sampling of the Searchable Environment

[AX]: The Boolean algebra or Searchable environment analysis of the Internet environment eliminates from calculation any page without a valid Inventory.

Valid Inventory: Means that a page matches at least one keyword of a given search pattern, where based on the content, trending and quality of the site a given page can be consider to have a fuzzy state such as 1=improbable, 2=reasonable, 3=probable, 4=most probable and 5=final destination, while randomly surfing the Internet.

[BX]: A Gamma function equivalent of the search pattern, where based on the independent and dependent variables the size of the environment is adjusted. [BX] can be categorized as follows: (x) AS IS classical inductive reasoning search for the past 40 years, (y) Assisted Input that matches exactly a human knowledge concept, idea or trending combination of keywords, (z) High quality reference site Assisted input search, (w) Smart Input using a right side of the brain checkmate combination using GPS coordinates, (+++) a direct search, where input automatically maps output.

[AX]: Eigenvectors eliminate irrelevant pages belonging to the Internet environment in order to create a searchable environment for each search pattern object, that becomes the new relevant Internet (U), that in turn is further index refined to create the [BX, CX, DX, and EX] layers of refinement in order to inventorize the content of each page and site.

[BX]: Gamma function attenuates improbable pages to create the improved environment. Note: The improved environment is a subset of the searchable environment after normalizing the probabilistic spatial environment to remove redundancy, spam and virus links. The Codex for each Search Pattern creates the [BX, CX, DX and EX] layers of refinement stores the top (n) pages into a partial Master Index.

[CX]: First Index Refinement attenuates reasonable pages from calculation. [DX]: Second Index Refinement attenuate probable pages from calculation. [EX]: After [BX] performed the first variance sample size and then [CX] the second variance sample index refining of the improved environment based on a search pattern, can derive the optimal dataset as a third variance sample size. The system stores optimal dataset.

[EX]: Third (Nth) Index Refinement attenuates most probable pages from calculations and elucidates at least one final destination that belongs to the optimal dataset. The total number of valid final destinations equals third variance sample size, ergo only direct searches where input with certainty maps output have 1 final destination dataset. The system can keep tract of personalized activities and stores each valid output.

To Summarize [AX to EX]: The [AX] search reduces the order of magnitude from billions to millions. The [BX] search reduces the order of magnitude from millions to 1,000,000. The [CX] search reduces the order of magnitude from 1,000,000 to 10,000. The [DX] search reduces the order of magnitude from 10,000 to 100 and finally the [EX] search has informational certainty and reduces the order of magnitude from 100 to 1 bypasses randomly surfing the web.

Real Time Index Refinement

The Codex updates partial changes of the Internet after analyzing discrete sample sizes of 100 to 1,000,000 pages based on the quality of the parent sites. For example: A 100 page sample size is used when the highest site rank is ≥8, a 10,000 page sample size when the highest site rank is ≥6, otherwise the sample size=1,000,000 pages.

First Index Refinement: A weighted sample of the Internet with first index refinement means that 1,000,000 low quality site weighted pages were analyzed and 1,000 or the square root of the weight will update the Codex. First Index Refinement=SQRT (1,000,000)=1,000.

Second Index Refinement: A weighted sample of the Internet with Second Index Refinement means that 10,000 medium quality site weighted pages were analyzed 32 and/or the square root of the weight will update the Codex. Second Index Refinement=SQRT (First Index Refinement or 1,000)=32.

Third (Nth) Index Refinement: A weighted sample of the Internet with Third (Nth) Index Refinement means that 100 high site quality weighted pages were analyzed and 6 or the square root of the weight will update the Codex. Third (Nth) Index Refinement=SQRT (Second Index Refinement or 32)=6. The Codex for each level of refinement stores and updates each optimal dataset in the encyclopedia.

Inductive Reasoning systems use the brute force approach and will compare all the documents like a chess program analyzing all the permutations, whereas Deductive Reasoning systems predict the sample size of probable, most probable and answer documents prior to any calculation as a search pattern, and thus minimizing the required throughput to perform the task.

Once the Codex knows the quality of the parent site for each document using rules of semantics, it can analyze the sample as a search pattern like chess grandmasters do and thus avoid tax burden calculations. Weighted samples: documents are given value based on the quality of the site, and furthermore of the frequency of same site documents within the sample.

Site Frequency Sample Size Approximately 1,000,000 Weighted Pages.

TABLE 6

Weighted low site page value for First Index Refinement

| Quality | 1 | 2 | 3 | 4 | 5 | 6 | 7 | 8 | 9 | 10+ |
|---|---|---|---|---|---|---|---|---|---|---|
| 6 | 1 K | 1 K | w | w | w | w | z | z* | | |
| 5 | 300 | 300 | 1 K | 1 K | w | w | w | w | z | z* |
| 4 | 1 | 2 | 4 | 10 | 25 | 60 | 130 | 350 | 700 | 300 |
| 3 | 1 | 1 | 3 | 3 | 3 | 50 | 510 | 300 | 600 | 100 |
| 2 | 1 | 1 | 1 | 3 | 3 | 3 | 10 | 10 | 10 | 30 |

Site Frequency Sample Size Approximately 10,000 Weighted Pages.

TABLE 7

Weighted medium site page value for Second Index Refinement

| Quality | 1 | 2 | 3 | 4 | 5 | 6 | 7 | 8 | 9 | 10+ |
|---|---|---|---|---|---|---|---|---|---|---|
| 8 | 300 | 300 | y | x* | | | | | | |
| 7 | 300 | 300 | y | y | x | x* | | | | |

Site Frequency Sample Size Approximately 100 Weighted Pages.

TABLE 8

Weighted high site page value for Third (Nth) Index Refinement

| Quality | 1 | 2 | 3 | 4 | 5 | 6 | 7 | 8 | 9 | 10+ |
|---|---|---|---|---|---|---|---|---|---|---|
| 10 | n* | | | | | | | | | |
| 9 | 50 | n* | | | | | | | | |

(n) denotes limit = 1
(x) denotes limit = 100
(y) denotes limit = 1,000
(z) denotes limit = 10,000
(w) denotes limit = 100,000
*Stop adding pages to sample Index Refinement Examples Using Simplified Math For example: (x) As is classical inductive reasoning search for the past 40 years the search pattern is "A+B+C" and creates a searchable environment of (2^28) or 268,435,456 pages and when converted into a search pattern using a gamma function maps an improved environment with 16,777,216 pages or (y) after normalizing the probabilistic spatial environment to eliminate redundancy, spam and virus links, from calculation as improbable pages. This means that 268,435,456−n=16,777,216 or n=251,658,240 pages, where eliminated from calculation.

The first index refinement for (x) yields 16,384 pages and for (y) yields 4,096 pages after eliminating from calculation reasonable pages.

The second index refinement for (x) yields 128 pages and for (y) yields 64 pages after eliminating from calculation probable pages.

The third (nth) index refinement for (x) yields 11.3 rounded up to 12 pages and for (y) yields 8 pages after eliminating from calculation most probable pages, and these pages are considered final destinations that belongs to the optimal output.

For example: (x) Assisted input using static analysis rules of semantics becomes transformed input "A+B+C" and creates a searchable environment of (2^28) or 268,435,456 pages, and when converted into a search pattern or (y) using a high quality site gamma function maps an improved environment, after normalizing the probabilistic spatial environment to eliminate redundancy, spam and virus links, with 524,288 pages or (z) after removing from calculation no reference pages as improbable pages. This means that 268,435,456−n=524,288 or n=267,911,168 pages, where eliminated from calculation.

The first index refinement for (x) yields 16,384 pages and for (z) yields 725 pages after eliminating from calculation reasonable pages.

The second index refinement for (x) yields 128 pages and for (z) yields 27 pages after eliminating from calculation probable pages.

The third (nth) index refinement for (x) yields 11.3 rounded up to 12 pages and for (z) yields 6 pages after eliminating from calculation most probable pages, and these pages are considered final destinations that belongs to the optimal dataset. Thus, the assisted input is more accurate than a classical "AS IS" search since less final destinations exist for (z) than (y).

For example: (x) Smart input using static analysis rules of semantics becomes transformed input "A" and creates a searchable environment of (2^28) or 268,435,456 pages and when converted into a search pattern or (y) using a GPS checkmate gamma function maps an improved environment after normalizing the probabilistic spatial environment to eliminate redundancy, spam and virus links, with 32,768 pages or (w) after removing from calculation improbable pages using GPS coordinates. This means that 268,435,456−n=32,768 or n=268,402,688 pages, where eliminated from calculation.

The first index refinement for (x) yields 16,384 pages and for (w) yields 181 pages after eliminating from calculation reasonable pages.

The second index refinement for (x) yields 128 pages and for (w) yields 14 pages after eliminating from calculation probable pages.

The third (nth) index refinement for (x) yields 11.3 rounded up to 12 pages and for (w) yields 4 pages after eliminating from calculation most probable pages, and these pages are considered final destinations that belongs to the optimal output. Thus, the smart input is more accurate than assisted input and the classical "AS IS" search since less final destinations exist for (w) than (y) and (x).

For example: (+++) Direct search using static analysis rules of semantics becomes transformed input "A" and creates a searchable environment of (2^28) or 268,435,456 pages and when converted into a search pattern (y) after normalizing the probabilistic spatial environment to eliminate redundancy, spam and virus links, using a left brain and right checkmate combination gamma function maps an improved environment, (in this case an Optimal element (A) using the benefit of U.S. patent application Ser. No. 11/584, 941 filed on Oct. 23, 2006 (issued as U.S. Pat. No. 7,809,659 on Oct. 5, 2010)), with 1 page or (+++) after removing from calculation all but 1 as improbable pages. This means that 268,435,455 pages, where eliminated from calculation. (+++) means informational certainty.

The first index refinement for (x) yields 16,384 pages and for (+++) yields 1 page after eliminating from calculation reasonable pages.

The second index refinement for (x) yields 128 pages and for (+++) yields 1 page after eliminating from calculation probable pages.

The third (nth) index refinement for (x) yields 11.3 rounded up to 12 pages and for (+++) yields 1 page after eliminating from calculation most probable pages, and the input maps optimal output. Thus, a direct search is more accurate than a smart input, assisted input and the classical "AS IS" search since the (+++) input maps exactly the final destination output.

Real Time Index Refinement Concepts

The index refinement transforms the content of each page into Glyphs and uses valid keyword and clusters in order to identify key featured associations and transitives. Each default human knowledge concept and valid keyword regular expression object is index refined, by probabilistically and contextually identifying valid sub ordinates using positional branching. The process of positional branching creates billions of smart and shopping cart objects.

Normalization is the process to remove redundancy, and using the benefit of U.S. patent application Ser. No. 10/603, 963, filed on Jun. 25, 2003 (issued as U.S. Pat. No. 6,614, 893 on Sep. 2, 2003) the ambient intelligence analyzes all the links from mapping the page as vector V is progressively constructed for each individual call by forward chaining through the simulation computers, and using the benefit of U.S. patent application Ser. No. 12/146,420, filed on Jun. 25, 2008 (issued as U.S. Pat. No. 7,908,263 on Mar. 11, 2011) a Super Page for each request has a Deductive Reasoning W_Rank Basis value that determines the relative weight that ranges from 0.001 (no good) to 10 (awesome).

Positional, Probable, Plausible Branching

Each position branching of the Summary Reports chain of command object can be further refined using another independent variable (n+1) to create probable branching objects, and further refined using independent variable (n+2) reasonable branching objects. This process creates trillions of new objects.

Encyclopedia Superset of Summary Report Objects or Optimal Dataset

Each Superset (I), Set (I, J), Subset (I, J, K) have their own unit object in the superset of regular expression chain of command. Each element Summary Report object contains the top (n) results that become output and are displayed in an order from highest to lowest, and also the key featured association and transitive of related concepts or entities and feedback equations that permit deductive reasoning set theory constructs analysis.

Human Knowledge Superset (I) Expansions: Each Superset (I) can have subordinates by using associative entities as independent variables (J) and (K) each possessing their own unit object. For example: The Internet or Superset (U) can be subdivided by country domains, language or quadrants [[LL, LR, RL, and RR]] based on the human brain equations.

Human Knowledge Set (I, J) Expansions: Each Set (I, J) can have subordinates by using key featured associations and transitives as independent variables (I) (when null) and (K) sub filters each possessing their own unit object. For example: Battle of Gettysburg event can be part to Superset ("Historical Battles") or to Superset ("American Civil War").

Human Knowledge Subset (I, J, K) Expansions: Each Subset (I, J, K) can have subordinates by using key featured associations and transitives as independent variables (I, J) (when null) sub filters each possessing their own unit object. For example: 33160 is an event that can be part to Superset ("Florida") or to Superset ("Restaurants") and Set ("Florida", "Restaurant") and so forth.

For each Superset, Set and Subset object the Codex creates metadata and stores the human brain equation use both [L] left brain equation English language key featured associations, and [R] right brain equation geospatial key featured association, and then gain factors the Top Results, and then using deductive reasoning feedback Glyphs equation to attenuates content with confounding variables to stabilize and reduces sensitivity parameter variations due to the environment as being an Evolving Fuzzy System.

The Codex using Summary Reports dataset derived from Business Intelligence metadata and human brain equation can now offer and display the highest satisficing advertisements to the end user and thus yield direct sales. Satisficing is a decision-making strategy or cognitive heuristic that entails searching through the available alternatives until an acceptability threshold is met.

The Codex continuously scans, scans and gathers the environment. Using the human brain, the Internet environment has been broken down. [R] The right side of the brain partitions the Internet into a managerial hierarchical relationship chain of command consisting of a plurality of super blocks, blocks, sub blocks, mini blocks and elements, whereas [L] the left side of the brain performs the same task using rules of linguistics and semantics based on the frequency and direct relationships between keywords and term clusters.

Then mimicking the human brain to simulate deductive reasoning to create a language based equation, a geospatial based decision, a human decision equation to interpret numerical and text data into transform input that maps a search pattern representing the mathematical equation used to determine the optimal partition of the Internet.

To reach 100% accuracy and precision the confounding elements of the search must be eliminated. The optimizer system uses deductive reasoning means of the feedback Glyphs equation that attenuates content with confounding variables in order to stabilize and reduces sensitivity parameter variations due to the environment. Direct searches eliminate the randomly surfing the web process and in turn automatically yields the final destination output.

Proactively Intercepting New Items

FIRST: A Web Crawler identifies a News Document and immediately converts the raw data into primed data by performing data mining and statistical analysis of the content reading the title, links and reading from the document each sentence and paragraph to identify relevant key featured associations and transitive relationships and thus eliminating most words of the document as being irrelevant. Upon receiving a significant difference document from the web crawler, the Codex proactively updates all the end users that are tracking, trending or searching for relevant informatics construct search pattern found in the original raw file.

Proactively Intercepting New Files

SECOND: A Web Crawler identifies a New Document and immediately converts the raw data into primed data by analyzing active users dataset of the content reading the title, links and reading from the document each sentence and paragraph to identify key featured associations and transitive keywords that are relevant and thus eliminating most words of the document as being irrelevant, the New Document is assigned a new page rank and all the relevant objects in the chain of command are updated. The Codex for each position determines if the new file is significant and updates their optimal dataset and has a partial master index for each position of the chain of command, and if the new file based on volatility and trending is significant, will trigger to renew the master index. Upon receiving a significant difference document from the web crawler, the Codex proactively updates all end users that are tracking, trending or searching for relevant informatics construct patterns.

The Codex analyzes and indexes the News Document and then for each valid search pattern assigns a commercial, content, elasticity, popularity, trending and volatility values that determine what is relevant within the newly identified document.

Significant difference search patterns based on the newly derived elasticity and volatility values are geometrically gain factored, since the commercial, content and popularity values are mostly static. When the New Document is determined to be of significant difference, the new document is proactively intercepted and is sent to the end user that is tracking or trending for a relevant search pattern. This automatic process is not a blind or brute force method instead it is a total quality management satisficing algorithm designed to minimize the output messages sent the end user.

Commercial Value: The Site commercial value for each new primed document.

Content Value: The quality and relevancy of each search pattern within the content.

Elasticity Value: Measures the frequency search patterns is updated. For example: American Civil War is the same as found in the $100^{th}$ anniversary issue of the 1912 encyclopedia Britannica and Spartacus the historical gladiator is static, whereas Caesar the TV series is elastic.

Popularity Value: Measures the value of the links and citations.

Trending Value: Search patterns within the content that are currently popular.

Volatility Value measures how many end users have searched the site based on the elasticity value of the site. This value is gain factored with exponential increments.

The Commercial, Content, Elasticity, Trending and Volatility values are adjusted based on the size of the improved environment they belong, thus a Subset (I, J, K) with 100 pages that has a new significant difference event with be affected more dramatically, than a Superset (I) with 1,000,000 pages or the parent Super Block with 1 billion pages.

Positional Branching (Set Theory Interpretation of Human Knowledge Concepts)

FIRST: Each summary object has a unique position in the chain of command.

SECOND: Each index relationship has key featured associations and transitives.

THIRD: Valid subordinates to each position are offered to the end user.

For example: USA would offer each of the fifty (50) States and corresponding counties and cities.

FOURTH: When a position is selected a new dataset is created.

For example: American Civil War is the search pattern selected from US History Superset (I) and then the user selects Robert E. Lee search pattern from US Military General Set (I, J). American Civil War becomes the first request and Robert E. Lee the second request. Now, the user picks Battle of Gettysburg from historical event Subset (I, J, K). The Battle of Gettysburg and its managerial hierarchical relationship indices becomes the third request, and the Glyphs belonging to American Civil War and Robert E. Lee Glyphs become dependent variables. Glyphs are valid entities belonging to the human knowledge encyclopedia.

Search Pattern: This is obtained from the end user interactively typing or speaking letters or completed words and optionally selecting assisted function command instructions.
 (1) American Civil War (1st search pattern)
 (2) Robert E. Lee (2nd search pattern)+American Civil War Glyph.
 (3) Battle of Gettysburg (3rd pattern)+American Civil War+Robert E. Lee Glyphs.

For example: Now, the end user picks the commercial Glyph game command instruction.

FIFTH: Each position can have subordinates available such as commercial, and map objects. For example: Now, the end user picks commercial Glyph computer game command instruction. Using within Battle of Gettysburg options.
 (4) Computer game (Assisted search command instruction) Battle of Gettysburg+American Civil War+Robert E Lee Glyphs.

SIXTH: Analysis of the superset of keyword regular expression will elucidate for each position, input that requires, maps, directions and Shopping Cart interface objects that yield personalized input. For example: Now, the end user picks a particular The Battle of Gettysburg Computer Game (Product ISDN number 1234 . . . 123). (5) The Battle of Gettysburg Computer Game (Product ISDN number 1234 . . . 123) is a direct search.

The Codex Bitmaps the preprocessed top (n) pages is based on the type of environment Superset (I)=1,024, Set (I, J)=256 and Subset (I, J, K)=64. For each position branching of the chain of command exhaustively calculating all the permutations of the combination of each key featured association and its own key featured associations that become transitives relationships.

Probable Branching (Set Theory Interpretations Using Associative Relationships)

The Codex analyzes the preprocessed top (n) pages by mapping each associative construct as a probable index relationship to the search pattern by attenuating pages not matching the index relationships, and then eliminating from calculation the bottom two thirds of the remaining pages. The Codex exhaustively determining for each associative construct if a new position exists when the number matches exceed the size of the next level (nth) object in the chain of command.

Probable objects: Superset (I) creates Set (I, J) with 256 pages, Set (I, J) creates Subset (I, J, K) with 64 pages and Subset (I, J, K) creates Elements (I, J, K, L) with 16 pages.

For example: When the Codex performs an informatics nesting such a Probable Branching of Superset (I)=American Civil War: Set (I, J)=American Civil War+Robert E. Lee is valid, whereas Set (I, J)=American Civil War+Gettysburg is not, since Gettysburg is geospatial and can only be a Subset (I, J, K). Note: Data mining relevant concept entities that are associative and transitive to an index relationship.

Plausible Branching (Set Theory Interpretations Using Transitives Relationships)

In this case, transitive relationships are mapped to the plausible index relationship. For each valid probable branching position the Codex promotes each transitive construct as a reasonable index relationship to the search pattern by attenuating pages not matching the index relationships, and then eliminating from calculation the bottom half. The Codex exhaustively for each transitive construct determines if a new position exists when the number matches exceed a threshold.

Likely objects are as follows: Superset (I) creates Subset (I, J, K) with 64 pages, Set (I, J) creates Elements (I, J, K, L) with 16 web pages and Subset (I, J, K) creates Answers with 4 pages. For example: When the Codex performs an informatics nesting such as a Reasonable Branching of Superset (I)=American Civil War the Set (I, J)=American Civil War+George Meade and Subset (I, J, K) American Civil War+George Meade+Gettysburg are valid. Each document of the American Civil War is likely to have Generals Robert E Lee and George Meade, but none would be able to construct an interpretation using set theory of both Generals with the Mexican America War within the 1861-1865 timeline.

Personalized Index Refinement

The Codex personalizes the preprocessed top (n) responses belonging to the optimal dataset that are displayed as output in an order from highest to lowest.

FIRST: Promotes a key featured association as an index relationship. Now, the Interceptor function determines if the new search pattern already exist in the chain of command. If yes, the search pattern is changed and a new dataset is created. For example: End user selects American Civil War search pattern and then selects Gettysburg.
 (1) American Civil War (First search pattern). End user's interactive input.
 (2) Battle of Gettysburg (Second search pattern)+American Civil War.

If the search pattern does not exist the following steps apply.

SECOND: For example: Now, the end user exhaustively continues with the interactive input process (personalized index refinement) by selecting additional command instruction.

THIRD: This process attenuates each page not having the new index relationships, and removes the bottom half of the remaining pages.

FOURTH: Repeatedly, the end user adds new index relationships and attenuates all of those pages not having the new index relationships, and removes the bottom half of the remaining pages until the size of the environment reaches one.

Assisted Input: Exact search patterns based on human knowledge.

Smart Input: Search patterns that can incorporate GPS coordinates to render a map.

Personal Input: Input with the highest informational certainty that automatically map the output requiring no further calculations and bypassing search engine capacities.

The Optimizer Transforms Interactive Input into Search Patterns

The Optimizer system transforms the user's interactive input into search patterns. Each search pattern has a unique managerial hierarchical indices and a set of natural variant command instructions associative and transitive entities to aid the user improve the input and remove the confounding elements of the search process.

The Codex Bypasses Input Going to the Search Engine

When the optimizer system is absent, the Codex preemptively analyzes interactive input and then transforms the input into Concepts (or Glyphs or Entities) and afterwards converts the Glyphs into a search pattern. Now, the Codex determines if a valid Summary Report optimal dataset exists by matching the search pattern index relationships. If yes, proactively sends the output to the end user in an order from highest to lowest. This is how existing assisted input technologies work.

The Codex Optimizes Input Going to the Search Engine

When the Optimizer system is absent and an exact match summary report object or optimal dataset does not exist the Codex performs the following:

FIRST: Replaces the input with the closest valid search pattern.

SECOND: Unused or remaining Glyphs become filters of the search process.

THIRD: The mathematical equation belonging to the search pattern becomes the basis for all calculations.

FOURTH: Maximizes (gain factors) unused Glyphs or Entities that have dynamic hot input values.

FIFTH: Minimizes (attenuates) unused Glyphs that have dynamic cold input values.

SIXTH: Sends the optimal input to the search engine.

As taught in U.S. patent application Ser. No. 14/028,508 (a parent of this application and incorporated herein by reference)

Codex Applies Indexing Refinement Using Set Theory

Now, that a valid summary report was found using informatics set theory branching means the preprocessed summary report object or optimal dataset can be gained factor and attenuated using the unused glyphs.

For example: The summary report object belonging to the Battle of Gettysburg is gained factored by indexing refinement of the unused glyphs belonging to request number 1 and number 2. First refinement is "American Civil War". Second refinement is General "Robert E. Lee". Note the end user never typed the prefix title General.

The Optimizer Sends Optimal Input to the Search Engine

The Optimizer system personalizes interactive, assisted and smart input into transform input using dynamic analysis rules of semantics. The ability to send optimal input to the search engine incorporates by reference the Optimizer Patented related art.

The Codex Stores Index Refined Human Knowledge

Now, that human knowledge has been arranged in managerial hierarchical distribution, each valid keyword and cluster search pattern object is created using the first independent variable that eliminates from calculation low valued web pages using index refinement. The top results are stored and continuously optimized to bypass the search engine capacities. Each Third Significant difference object maps a Superset (I), and has a weighted 1 million web pages. Each of these objects has a corresponding concise search equation with twelve (12) key featured associations and twenty-four (24) key featured transitives that are used to create the improved environment. Concise search equations map Superset (I) environments and belong to the simple layer of refinement. Now, we have 16 million summary report objects, then how do we reach billions or trillions? For billions precise, optimal and direct search equations, and to reach trillions, index refining the best fit web pages of each summary report object. Precise search equations map Set (I, J) optimal environments and are stored in the hybrid layer of refinement. Now, we have 128 million summary report objects.

Optimal search equations maps Subset (I, J, K) optimal solutions and are stored in the complex layer of refinement. Now, we have billions Summary Report objects.

As taught in U.S. patent application Ser. No. 14/013,018 (a parent of this application and incorporated herein by reference)

Shopping Cart/Advertisement Subsystem.

The Codex for direct search equations after receiving command instructions to remove the confounding elements of the search process, and is able to put buyers and sellers together using X_FOB and Y_CDIF means. Direct searches are created with the end user's dynamic mathematical equation with six independent variables, and thus have Informational Certainty. Personalized Summary Report objects are stored in the user history.

Each summary report object, similar to a Site organization, by default has its own chain of command comprising of the most probable subordinates using informatics set theory branching that analyzes the best fit web pages of the search pattern mathematical equation derived improved environment. During the index refinement analysis of each search pattern, web pages that yield GPS and mapping information are gain factored and stored in the summary report object. Shopping cart information that yields X_FOB or Y_CDIF information is also gained factor. For example, the free content of the web page yield an intellectual property (music song) that the end user will want to watch or listen.

Each geospatial summary report object that represent a populated partition of the world geography is bound by a commercial chain of command template that is specific to country, state and county and its demographics. Each object subdivides the content as if to create a yellow and white pages phone book of the web pages that are bound to the improved environment, for example, restaurants, types of restaurant, specific restaurants, and then maps the information into smart input. End user's known IP Addresses and GPS coordinates are converted into ANI-like information and are also incorporated. The shopping cart also incorporates demographics and trending satisfactions dimensions.

Using informatics set theory branching of each of the summary report objects yields trillions of possible permutations with a probabilistic vector value only and that may be stored, since they are more than 1,000 times the searches done in a year by humanity in 2013. According to search facts a total of 300 billion searches are performed per year, and thus we can estimate that 250 billion searches are redundant. The Codex furnishes the optimal preprocessed results for redundant searches.

The Codex updates in real time each partial master index, summary report object using set theory branching.

BRIEF SUMMARY OF THE PRESENT INVENTION

Legacy search engines mimic inductive reasoning popularity based methods for finding the best results, whereas the Codex solves for the optimal environment using deductive reasoning set theory constructs analysis to find the optimal dataset and best results. The Internet must be organized by the Codex supercomputer into a chain of command comprising of superblocks, blocks, sub blocks, mini blocks and elements depending on the amount of independent variables contained in each search pattern. Each position branching of the chain of command belonging to the entire superset of regular expressions is stored in the 'CORE List' database. The Codex upon detecting a new valid and unique input creates a new unit object in the 'CORE List' database.

The Optimizer is the client side of the architecture and interactively transforms input into a search pattern. The output is sent to the end user browser and displays the top (n) results, in an order from highest to lowest, requiring no further calculation and bypassing the search engine capacities. Each unit object search pattern has a Summary Report object or optimal data with the preprocessed top (n) results or output.

The [L] left side of the brain equation is a managerial hierarchical index relationship dataset, which create the improved environment. The [R] right side of the brain equation is the secondary method using geospatial information. The entire superset of keyword regular expressions and human knowledge is converted into search patterns object that possesses independent variables (I, J, K, X, Y, Z).

The CORE List of human knowledge that makes up all unique keywords and cluster is assigned by category and subcategory, which is the basis for the Encyclopedia. Top (n) Results are stored for each Summary Report object optimal dataset. The Codex applies set theory interpretations using the trending to the Top (n) Results to create hundreds of millions positional branching objects. For each object Codex index refines applies set theory association relationships (n+1) to create billions of probable branching objects, and applies set theory transitive relationships (n+2) to create trillions of plausible branching objects.

BRIEF DESCRIPTION OF THE DRAWINGS

Various exemplary embodiments of this disclosure will be described in detail with reference to the following figures, wherein like numerals reference like elements, and wherein.

DETAILED DESCRIPTION OF THE PRESENT INVENTION

Figure 1:
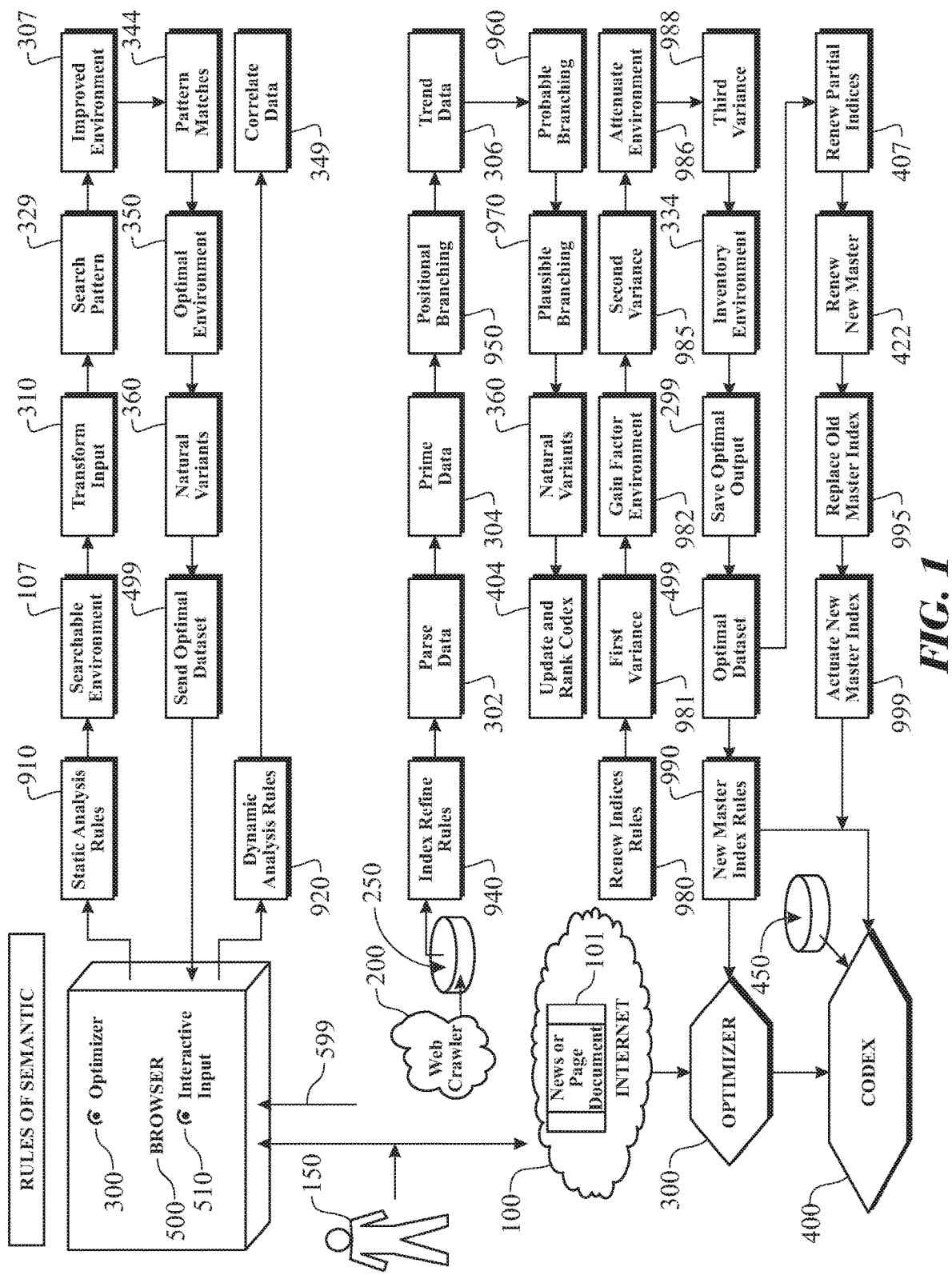
FIG. 1 presents a schematic operational flow diagram describing an exemplary deductive reasoning search engine.

Informatics Set Theory Branching of Interactive Input 510 (FIG. 1)

A use rules of semantics are illustrated in FIGS. 1 through 8, as follows:

The Codex 400: Controls all the Summary reports objects (or pre-calculated optimal dataset 499) and uses rules of linguistics, semantics and human knowledge to update the entire superset of objects with minimal throughput usage using the encyclopedia data warehouse 450 (hereinafter referred to as encyclopedia).

Web Crawlers 200: Continuously scan, gather and parse 302 information from the Internet 100 and transform new file raw data 101 into primed, normalized, and mapped data 304 (hereinafter referred to as primed data), for human monitoring and evaluation.

HIVE 700: Using the benefit of U.S. patent application Ser. No. 10/603,963, filed on Jun. 25, 2003 (issued as U.S. Pat. No. 6,614,893 on Sep. 2, 2003), the summit cluster that reevaluates, synchronizes and coordinates the Codex 400 and the use of web crawlers 200 and the information gathering cluster subsystem that continuously gathers, distills and analyzes the Internet environment 100 executing informatics set of instructions based on rules of semantics.

Primed Data 304: Validates each word of the input using rules of linguistics, semantics and human knowledge to assign a mathematical lingua franca meaning that becomes the optimal input. For example: Cat is mapped to Gato in Spanish and Chat in French.

Webpage database 250: Web Crawler 200 uses executes rules of semantics based on rules of semantic and linguistic to analyze and parse 302 each new file 101 and prime 304 the content into data comprehensible for human monitoring and evaluation and then stores all index relationship combinations, the master index and the entire human knowledge chain of command partial master indices 222. When the Codex 400 actuates the Master Index 999, then all elements of the Encyclopedia 450 with significant difference changes are synchronized.

Search Pattern Matching 344: The Optimizer 300 searches the Codex Encyclopedia 450 for a match and uses the corresponding partial master index 222 to gain factors and attenuates pages to create a personalized optimal environment 350 and to discovers natural variants command instructions 360 to help the user randomly surf the web.

When the Search Pattern Matching 344 a known assisted function Search Pattern 329 then the search process is bypassed and the optimal dataset 499 is automatically sent to the end user computing device and display as output in a order from highest to lowest.

Encyclopedia 450: Stores 299 and updates the entire superset of human knowledge objects that are derived from index refining as follows:

(A) The searchable environment 107 using positional branching 950,
(B): The improved environment 307 using probable branching 960 and
(C) The optimal environment 360 using plausible branching 970.

Upon discovering a search pattern 329 can respond to interactive input 510 by sending the optimal dataset 499 as output, bypassing the search engine and displaying the output 599 from highest to lowest.

Rules of Semantics (900, 910, 920, 940, 980, and 990), as based on claim 1 of U.S. Pat. No. 8,456,386, is as follows: CORE List Element Rules 900 teaches how to build each element of the managerial hierarchy Encyclopedia 450. Static Analysis Rules 910 teaches how to create search patterns for single requests, whereas Dynamic Analysis Rules 920 apply for at least two requests. Index Refine Rules 940 teaches how to update elements of the Encyclopedia 450, and Renew Indices Rules 980 teaches how using samples of significant difference of the searchable environment 107, the improved environment 307, the optimal environment 350 and optimal dataset 499 and corresponding partial master indices 407 are updated in real time. Finally the New Master Index Rules 990 teaches how to actuate the Master Index.

Internet 100: Described as a spatial environment comprising billions of links that maps Site and Web Pages and associated group of audio, product, services and video resources.

Searchable Environment 107: A subset of the Internet 100 using 'Boolean Algebra' to eliminates pages not having at least one word or concept of the interactive input 510.

Search Pattern 329: The optimizer 300 maps and transforms 310 the interactive input 510 into a lingua franca mathematical search pattern 329 after analyzing the normalized searchable environment and probabilistically creates the Improved Environment.

Improved Environment 307: The 'AFTER' after culling the searchable environment or 'BEFORE' using the independent variables to probabilistically remove improbable web pages.

Optimal Environment 350: A small sample subset of the Improved Environment 307 mapping the Search Pattern 329 and by gain factoring natural variants 360.

Optimal Dataset 499: Comprises of the top (n) results when using Static Analysis Rules 910, the best-fit results when using Dynamic Analysis Rules 920, and the final destination when information certainty exists and the input 510 automatically maps the output 599.

Natural Variants 360: Using rules of association, likelihood and relevancy, the optimal dataset 499 is analyzed to offer valid command instructions to assist the search.

Interactive Input 510: As the end user types or speaks input comprising of letters, words and numbers that are mapped into relational entities upon searching the encyclopedia 450.

Transforms Input 310: The Optimizer maps the interactive input 510 into an optimal input after find missing gaps of information, category, and index relationships.

Category: Each search is assigned a human knowledge category.

Sub-Category: Once a category is identified that maps an independent variables using informatics set theory branching assign a natural variant subcategory based on the search pattern 329 and then determines the type of search and corresponding type of output. For example: WALMART becomes smart input that uses the GPS coordinates of the end user to render a map.

Media Value database 750: The Hive 700 monetizes 799 the financial value of the optimal dataset 499 using the Shopping cart and Advertisement subsystem.

Virtual Maestro 800: Artificial intelligence entities that analyzes optimal input 310 and pattern matches 344 searching the Encyclopedia 450 to find an optimal dataset 499. The summit cluster monetizes the dataset 799 as the output 599 permitting the virtual maestro 800 to engage using a script in a substantive communication with the end user 150.

Script database 850: The virtual maestro 800 uses the optimizer 300 to discover a search pattern 329 and then the Codex 400 searches the Encyclopedia 450 to identify natural variants 360 in order to promote products and services using the monetized optimal dataset 799.

Informatics Set Theory Branching of an Object

Informatics set theory branching: Creates objects using layers of refinement to cull the searchable environment into exact size improved environments.

First, creates concise search objects 469 with an environment of 1,000,000 pages.

Second, creates precise search objects 479 with an environment of 10,000 pages.

Third, creates optimal search objects 489 with an environment of 100 pages.

Natural Variants Objects 360: Analysis of a search pattern 329 improved environment 307 using informatics set theory constructs discovers relevant knowledge branches or key featured associations. For example: (1) American Civil War. (2) American Civil War+Battle (3) American Civil War+Battle+Gettysburg, using interactive input 510 will yield the same as (4) Gettysburg. (5) Gettysburg+Battle. (6) Gettysburg+Battle+American Civil War that yields the Historical Event of the Battle of Gettysburg that occurred Jul. 1-3, 1863.

Usage Pattern of Behavior Now, the order of the word, and the frequency of the words affect the vector value of each word or cluster using the Hot and Cold algorithm and informatics set theory branching to gain factor and attenuate the context of each page belonging to the optimal dataset 499 during the cherry picking of personalizing the output 599.

Informatics Set Theory Branching: Does not required to correlate spatial environments when the command instruction maps an existing object and can discover additional natural variations identified during the index refinement of an improved environment 307. Each natural variant 360 object is assigned to a corresponding layer of refinement.

Natural Variants Belonging to an Object

Informatics set theory sub branching: from 'AFTER' improved environment further analysis creates natural variant objects 360 as follows:

First, concise search variants 464 with 100,000 pages.
Second, precise search variants 474 with 1,000 pages.
Third, optimal search variants 484 with 10 pages.

Command instruction dataset collection: The optimizer 300 searches the Codex 400 encyclopedia data warehouse 450 to discover probabilistic natural variant objects using trending 306, freshness and elasticity valuations of human knowledge concepts. The user controls, decides and picks how to refine the interactive input 510.

User Selected refinement: For example: selecting a command instruction readily maps a concise 469, precise 479, optimal 489, direct 499 search object now based on human knowledge discovery set theory constructs concise 464, precise 474 and optimal 484 search variants are offered to the end user.

[AX] is a low accuracy 'Boolean Algebra' search with an ambient size in the millions.

[BX] is a higher certainty search with one (1) assigned category and independent variable with an ambient size concise search object 469=1,000,000 and concise search variant 464=100,000, which is a human knowledge key featured association.

Thus, the 'BEFORE' is a vague search, and the 'AFTER' is a concise search that maps a human knowledge concept belonging to the Encyclopedia, and has an optimal dataset 499.

[CX] is more certain with one (1) assigned sub category and two (2) or three (3) independent variable with an ambient size precise search object 479=10,000 and precise search variant 474=1,000.

Thus, the 'AFTER' is a concise search 469 that maps an improved environment 307, and the 'IMPROVED' after finding missing gaps of information is a precise search 479 that maps a better human knowledge concept that is part of the Codex 400, and has an optimal dataset 499.

[DX] is more certain with two (2) assigned sub category and three (3) or five (5) independent variable with an ambient size optimal search object 489=100 and optimal search variant 474=10.

Thus, the 'IMPROVED' is a precise search that maps an optimal environment 350 or Output that is a subset of the improved environment 307, and the 'OPTIMAL' after eliminating the confounding elements is a optimal search 489 that maps a plurality of related human knowledge ideas and concepts belonging to the Codex 400, and has an optimal dataset 499.

[EX] is when the input automatically maps mathematically in lieu of linguistics the output, and the deductive reasoning checkmate combination is dissected to make the corresponding semantics and human knowledge equivalences that yield the final destination 499.

In a nutshell, the process of index refinement uses probabilities to eliminate pages from calculation [AX] uses 1 or 2, [BX] 2 to N, whereas a [EX] has the highest (N), where the greater the value for (N) the set theory constructs are more reliable and robust.

Checkmate Combination where Input Maps Output

Informatics set theory branching can offer direct searches, where the input 510 automatically maps the output 599. In some cases the search process ends and instantiates a transaction shopping cart interaction that puts the buyer and the seller together.

Customer Satisfaction Business Intelligence Calculations

The Codex 400, system, performs analysis of the optimal dataset 499 in order to offer natural variants command instructions 360, and the performs business intelligence set of informatics instructions to commercialize and monetize the dataset 799 as output 599, and then sends the output 599 as a response to the end user 150 based on what is being said or typed interactively as 510 input. The human decides and not the search engine based on the usage of behavior as interactive input 510 is transformed 310 into personalized search pattern 329.

The virtual maestro 800 analyzes both the personalized search pattern 329 and the output 599, and then searches the script database 850 to obtain the AI Script dataset 899, containing the informatics set of instructions of how to communicate with the end user 150.

For example: When the user transforms typing "AME" into "AMERICAN CIVIL WAR" by selecting a command instruction, the end user has selected a concise search 469 and then user continues to type "BA" that becomes "AMERICAN CIVIL WAR BATTLES" by selecting a command instruction, the end user has selected a concise search natural variant; afterwards the user continues to type "GE" that becomes "AMERICAN CIVIL WAR BATTLES GETTYSBURG" by selecting a command instruction, the user has selected a precise search 479, now the Codex 400 system analyzing the usage pattern identifies the Historical Event of the Battle of Gettysburg that occurred Jul. 1-3, 1863 that is an optimal search 489.

What is the difference between the searchable environment 107, improved environment 307, and the optimal environment 350, first the searchable environment 107 is a 'Boolean algebra' estimation of the number of links belonging to a spatial environment for a regular expression 510, as the optimizer uses static analysis rules 910 that transform interactive input comprising of words and numbers into a concept that becomes a search pattern 329, the Codex normalizes the searchable environment 107 in order to remove redundancy, spam and viruses, and improve information certainty and maps an improved environment 307 using W_RANK method of layers of index refinement. The optimal environment 350 is a small sample subset of the improved environment 307 that is updated in real time as significant change is detected in the Internet 100, and is stored as an optimal dataset 499, containing the optimal element (A) or final destination.

First example for the search pattern "American Civil War", the searchable environment 107 has 200,000,000 links and displays as output 599. Does this mean the search engine eliminated 199,999,990 by actual reading them? No, the lion share is irrelevant from the searchable environment 107. How is this accomplished? First, spam and virus are eliminated. Second, normalizing duplicates to figure out from U.S. patent application Ser. No. 12/778,228, filed on May 12, 2010 (issued as U.S. Pat. No. 8,239,229 on Aug. 7, 2012) inventory in hand or U.S. patent application Ser. No. 10/603,963, filed on Jun. 25, 2003 (issued as U.S. Pat. No. 6,614,893 on Sep. 2, 2003) V vector that represent the single version of the truth links, to map an improved environment 307 of 1,000,000 reasonable pages that represents a concise search 469. Third, now using quality values any page beyond the first variance sample size 981 is attenuated. In this, case SQRT (200,000,000) equals 14,142 pages. Fourth, the Codex 400 creates a precise search object 474 with 10,000 probable pages.

The resulting 10,000 probable pages are still too much. If an end user reads 1 paragraph from the top 10,000 results they would have read the equivalent of the Bible. Fifth, probabilistically create an optimal environment 350 with a second variance 985 sample size or SQRT (10,000) or 100 most probable pages. Finally, the Codex figures out that potentially 10 final destinations exists based on the third variance 988 sample size. This explains, why the Codex 400 performs EX index refinement to the nth layer that is SQRT (10) or 3 belonging to the third variance 988 sample size, in order to recommend with certitude results after cherry picking the actual content that are satisfying to the end user based on business intelligence. U.S. patent application Ser. No. 12/146,420, filed on Jun. 25, 2008 (issued as U.S. Pat. No. 7,908,263 on Mar. 11, 2011) further teaches that a plurality of searchable environment 107 may exists during a session while randomly surfing the web, and thus a improved environment 307, and the optimal environment 350, first the searchable environment 107 is a 'Boolean algebra' estimation of the number of links belonging to at least one spatial environment for at least regular expression 510, as the optimizer uses dynamic analysis 920 rules of semantics that interactive input 510 is transformed 310 from words and numbers into a concept that becomes a search pattern 329, the Codex 400 normalizes the at least one searchable environment 107 in order to remove redundancy and reach information certainty and maps an improved environment 307 using W_RANK method of layers of index refinement. The optimal environment 350 is a subset of the improved environment 307 that is updated in real time as significant change is detected in the Internet 100, and is stored 299 as an optimal dataset 499; then the optimizer 300 performs the Hot algorithm to gain factor data and Cold algorithm to attenuate data based on usage pattern of behavior. Using the benefit of U.S. patent application Ser. No. 10/603,963, filed on Jun. 25, 2003 (issued as U.S. Pat. No. 6,614,893 on Sep. 2, 2003) Codex first: Continuously processes and filters raw data into primed data 304 comprehensible for human monitoring and evaluation as an optimal dataset 499. Second: Analyzes and parses 302 through news, data and information in real time to determine portions thereof having relevance to the most recent primed data 304 received. Third: Analyzes primed data 304 in real time to determine portions thereof having trending 306 relevance. Fourth: Executes a set of software instruction to compare the primed 304 data 304 to the search pattern 329 in real time. Fifth: Proactively pattern matches 344 the optimal environment 350, picks the optimal dataset 499 as output and automatically sends the personalized output in an order 599 to the end user.

Sending Optimal Dataset 499 to the End User

FIGS. 1 through 8 display optimal output as follows: The Codex system 400 responds with optimal Output when Informatics set theory branching Interactive Input find a valid object in the human knowledge encyclopedia, otherwise determines if a new optimal object was discovered and immediately index refines the searchable environment 107 into a chain of command of subordinate natural variants 360 consisting of key featured associations and transitives.

The Codex system 400 responds using Informatics set theory branching Interactive Input to the Optimizer 300 with preprocessed optimal dataset 499 from the encyclopedia 450.

The Codex system 400 responds using Informatics set theory branching Smart Input to the Optimizer 300 adds the GPS coordinates of the computing device 150 to the search pattern to respond with the preprocessed optimal dataset 499 that is display in an order as output 599.

The Codex system 400 responds to direct input using Informatics set theory branching to the Optimizer 300 and takes both sides of the human brain checkmate combination to discover the optimal environment 350 and update the user with personalized dataset 499.

Transforming Raw Documents into Primed Data 304 for Monitoring and Evaluation

The deductive reasoning search engine or the Codex system 400 uses web crawlers 200 to continuously gather, distill and analyze the Internet 100 using Index Refine Rules to updated recent News and content Documents 101 and then web crawlers 200, parse 302, and prime 304 into valid search pattern 329 for human monitoring and evaluation. The Codex system 400 uses business intelligence, and commercializes and monetizes content to trend data 306.

Rules of Semantics to Store Entities 499 into the Encyclopedia 450

The Codex system 400 stores hierarchically the entire superset of regular expressions and human knowledge search patterns 329 into the encyclopedia 450 data warehouse. Then the Optimizer 300 uses human knowledge obtained from the encyclopedia 450 to perform Informatics Set theory constructs by applying Static Analysis 900, Dynamic Analysis 920 and Index Refine Rules 940 that transform interactive input 510 obtained from computing devices belonging to user 150 into a search patterns 329, and dynamically adjusts keyword values based on usage patterns of behavior, discovering Natural Variants 360.

The Codex system 400 proactively determine the freshness, volatility and elasticity of the significant changes in order to measure trending data 306 employing the Encyclopedia 450, and webpage database 250 in real time using informatics set theory constructs based on positional 950, probable 960, and plausible 970 branching in order to find natural variant command instructions 350 that are related to the interactive input 510 and cull the searchable environment 107 to map an improved environment 307.

The Web Crawlers 200 upon detecting a significant difference News and/or Documents 101 from the Internet, parse 302, prime and map data 304 and store 299 them into the Webpage database 250. The Codex 400 executing informatics instructions using Renew Indices Rules 980 of semantics searches the Encyclopedia data warehouse 450 trending 407 data to discover human knowledge to gain factor 982 the improved environment 307 and probabilistically map 304 each search pattern 329 using the First Variance 981 sample analysis to find positional branching 950 to identify natural variant command instructions 350 comprising of concise 469, precise 479, optimal 489 searches objects.

The Web Crawlers 200 attenuates 986 the improved environment 307 performing the Second Variance 985 sample analysis to find probable branching 960 natural variant command instructions 360 comprising of concise 464, precise 474, optimal 484 searches.

The Web Crawlers 200 inventories 989 the improved environment 307, performing the Third Variance 988 sample analysis to identify plausible branching 970 in order create and save in the Codex Encyclopedia 450 the optimal dataset 499 derived from the analysis of the optimal environment 350. The First Variance 981, Second Variance 985 and Third Variance 988 sample analysis probabilistically maps 304 each interactive input 510 transformed into a search pattern 329 to create an optimal dataset 499 that includes, page links, hyperlink to relevant human knowledge, advertisements, maps, and natural variants 360 for index refining.

The Codex system 400 updates and renews the plurality of partial master indices 407 within a predefined time using New Master Index Rules 980 in order to create a new master index 422, and then replaces the old master index 995 with the newly created one, and immediately actuates 999 the New Master Index that contains the most current significant changes in the environment.

Figure 2:
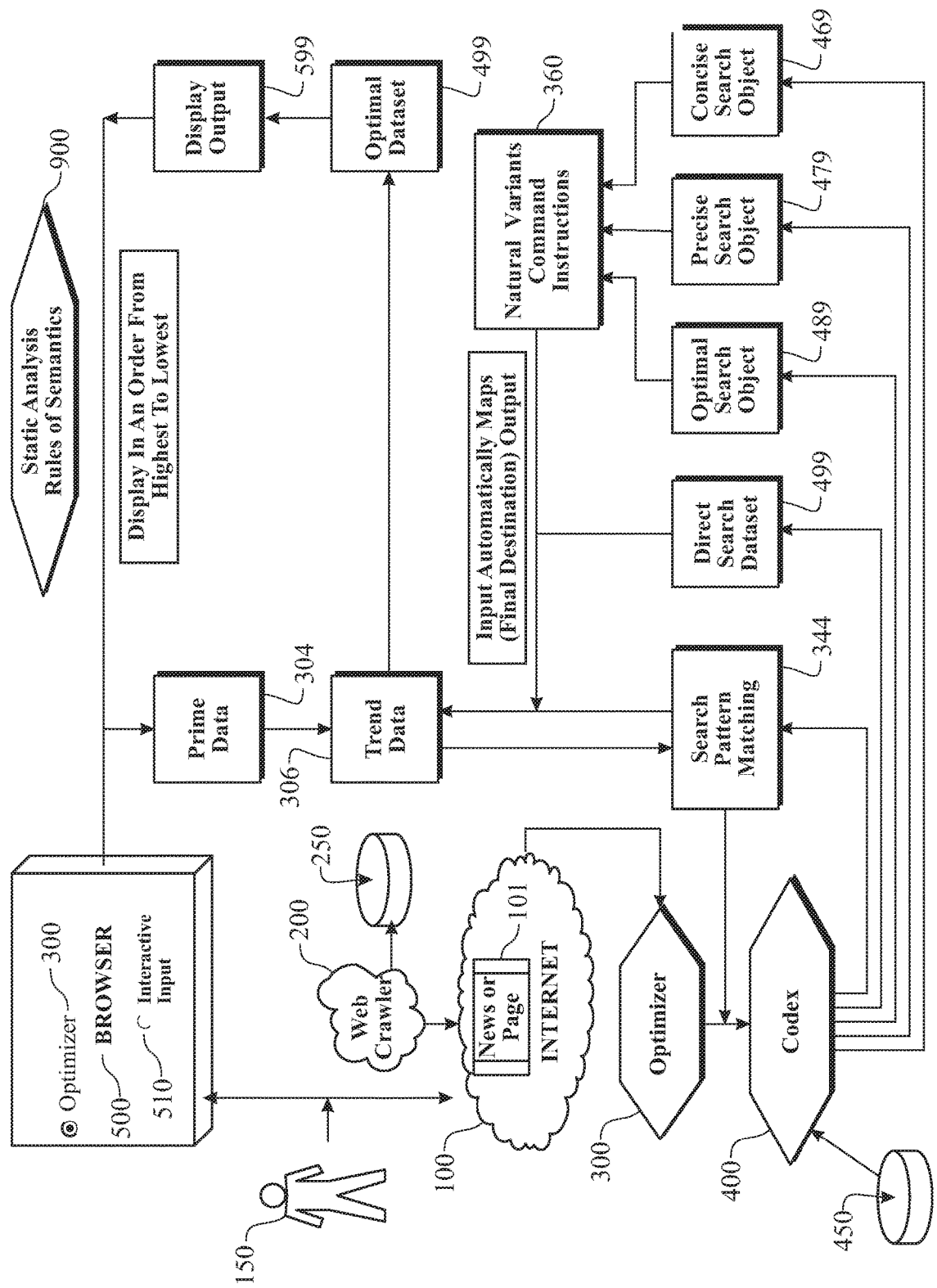
FIG. 2 presents a schematic operational flow diagram applying rules of semantics for existing objects.

A block flow diagram of rules of semantics for static objects 900, illustrated in FIG. 2, explains how to gather, distill and analyze interactive input 510 using static values to find with positional branching 950 the optimal environment 350 corresponding to a search pattern 329 and offer available natural variant command instructions 360 comprising of concise 469, precise 479, optimal 489, and direct 499 searches that cull the Internet and find optimal dataset 499.

The Codex 400 performs human knowledge discovery to identify concise search 464, precise search 474, and optimal search 484 variants 360 based on the analysis of analysis of the optimal environment 350.

Referring to FIG. 1, Transforming Raw Documents 101 into primed data 304 for monitoring and evaluation to see how end users 150 build interactively input 510 from their console devices, and the Codex 400 using rules of semantics creates a search pattern 329. For example: "guerre civile américaine" or "guerre de Sécession" in French yields "guerra civil americana" or "Guerra de Secesión" in Spanish that can also yield in English "American Civil War" or "War between the States", note that "session" and "between the States" are missing gaps of information that are easily mapped during the index refinement process as natural variations 360 of the concept.

As illustrated in FIG. 1, Rules of Semantics store entities into the Encyclopedia, demonstrate how web crawlers parse 302 documents into primed data 304 using informatics software instructions constructs based on grammar, human knowledge and semantics, and upon detecting significant changes renew indices 407, 422 for each search pattern 329. The concept relies upon and claims benefit to U.S. patent application Ser. No. 10/603,963, filed on Jun. 25, 2003 (issued as U.S. Pat. No. 6,614,893 on Sep. 2, 2003).

Discovering Natural Variants, as illustrated in FIG. 1, outlines how the Codex 400 performs the index refinement to the nth layer in order to create concise search 469, precise search 479, optimal search 489 and/or direct search 499 objects and then identifies natural variant command instructions to help the end user reach quicker the final destination by offering: First, concise variant objects 464, that are concept and ideas offered to the end user as assisted input 564 functionality. Second, the Codex 400 can offer key featured associations that become precise search variants 474 that further improve the search. Third, the Codex 400 can offer key featured transitives that become optimal search variants 484 that further improve the search. Fourth, the Codex 400 can incorporate the GPS coordinates of the end user that become optimal search variants 484 that further improve the search with geospatial data. When available will offer a collection of natural variants command instructions 360 based on the end user's decisions. In other words human's decisions create the personalized optimal dataset 499.

Figure 3:
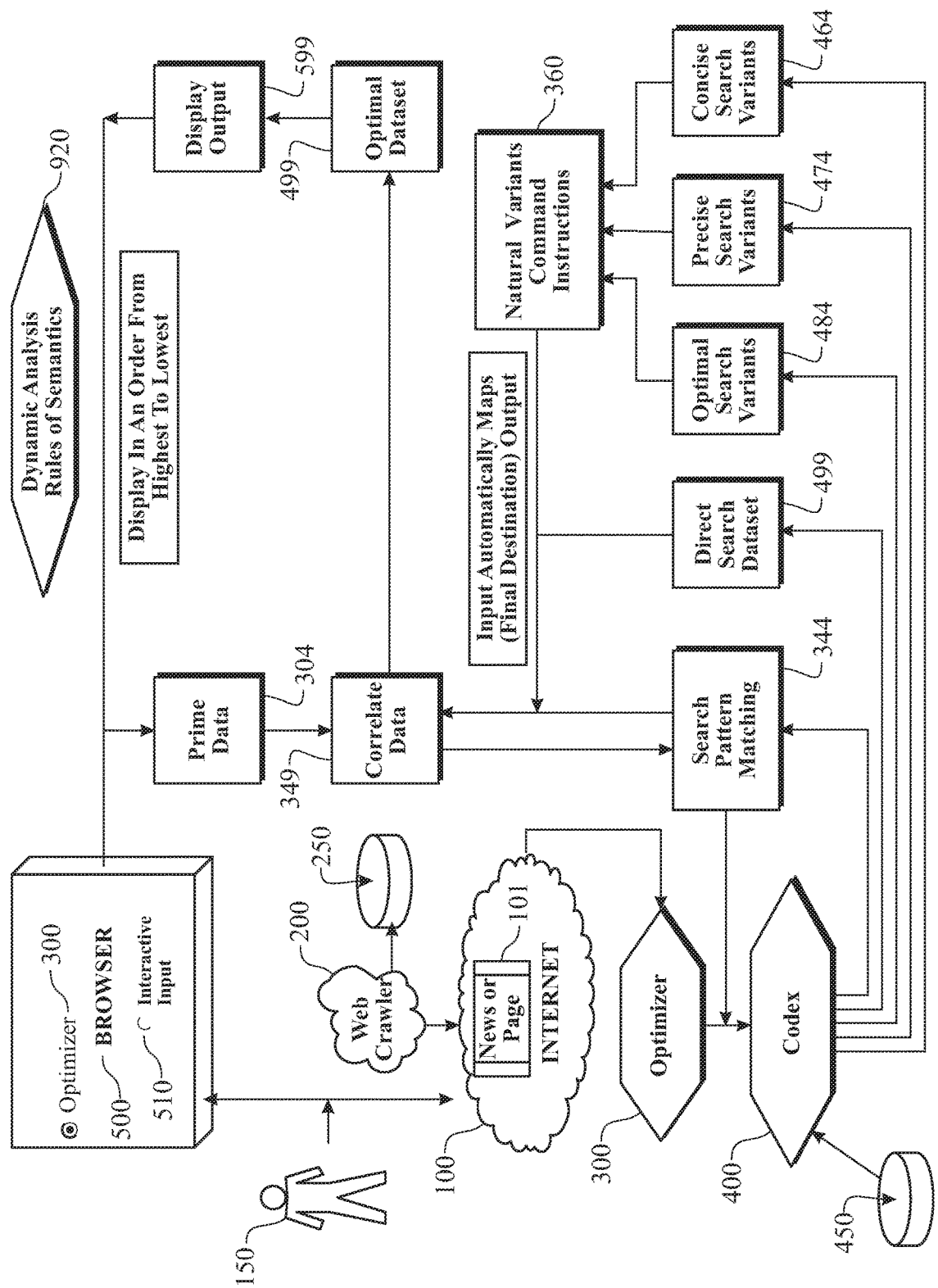
FIG. 3 presents a schematic operational flow diagram applying rules of semantics for dynamic objects.

A process for updating Codex search patterns is presented in FIG. 3. Updating Codex search patterns using rules of semantics for dynamic objects and explains how to interactively correlating data 349 find with knowledge branching the dynamic search pattern 329 and offer available command instructions 360 comprising of concise 464, precise 474, optimal 484 search variants objects upon analyzing with usage patterns of behavior the optimal environment 350, and figuring out checkmate combination direct searches that with certainty automatically map the final destination 499. Dynamic searches use smaller sized environments by gain factoring and attenuating based on usage pattern of behavior.

Based on FIG. 2, discovering natural variants the Codex 400 identifies natural Variants 360 comprising of concise 464, precise 474, optimal 484 searches from the optimal environment 350 that is a subset of the improved environment 307, and then correlates data 349 by gain factoring most probable pages, and attenuating reasonable and probable pages using variance sample sizes to discover the optimal environment 360. Once the encyclopedia has billions of optimal dataset 499 saved as preprocessed output, the Codex system 400 acts as an interceptor of messages to bypass the search engine, and eliminate repetitive requests. The Codex 400 acts as an interceptor of requests in any language and thus removes saturations, maximize throughput, and minimizes hardware requirements.

The Codex 400 searches the encyclopedia 450 that has the entire superset of optimal dataset 499 after performing index refinement to the nth word and replaces 'CORE List'. In this case, the Codex system 400 uses dynamic analysis rules of semantic 920 to correlate data 349 and assign the independent variables to a search pattern. Based on FIG. 1 discovering natural variants 360 the Codex 400 performs the index refinement to the nth layer in order to create a concise search 469, a precise search 479, an optimal search 489 and a direct search dataset 499 objects and then identifies natural variant 360 to help the end user reach quicker the final destination. The Codex system 400 used deductive reasoning, human knowledge and business intelligence to offer a collection of natural variants command instructions 360 based on the end user's decisions.

Figure 4:
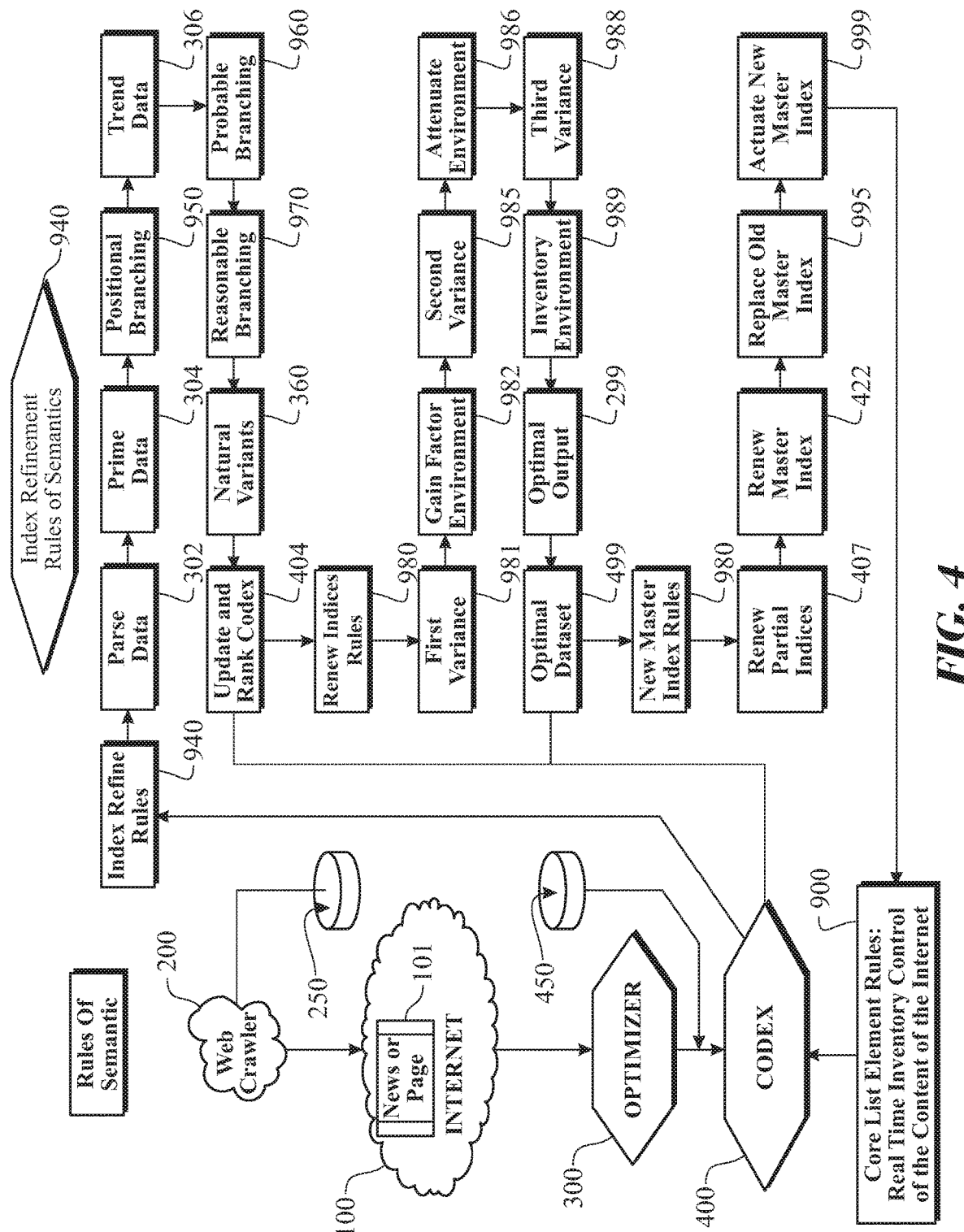
FIG. 4 presents a schematic operational flow diagram applying index refining in real time search patterns using rules of semantics.

Index refining in real time search patterns using rules of semantics is presented in FIG. 4. Based on FIG. 1, discovering natural variants teaches how Codex 400 performs the index refinement to the nth layer and correlates data 349, and how web crawlers 200 upon detecting significant trending data 306 updated the optimal environment 360.

The Codex system 400 applies Renew Indices Rules 980 to each search pattern to identify positional branching 950 as shown in FIG. 2, using human knowledge to identify probable branching 960 in order to discover natural variants 360 comprising of concise 464, precise 474, optimal 484 searches, and then uses reasonable branching 950 in order create the optimal dataset 499 where input automatically maps output and formatting, pre-calculating and prefabricating the display output 599 that is sent to the end user bypassing the search capacities.

Finally, ambient changes renews the plurality of partial indices 407 within a predefined time using New Master Index Rules 980 to create a new master index 422, and then replaces the old master index 995 with the newly created one, and immediately actuates 999 the New Master Index that contains the most current ambient changes in the environment.

Figure 5:
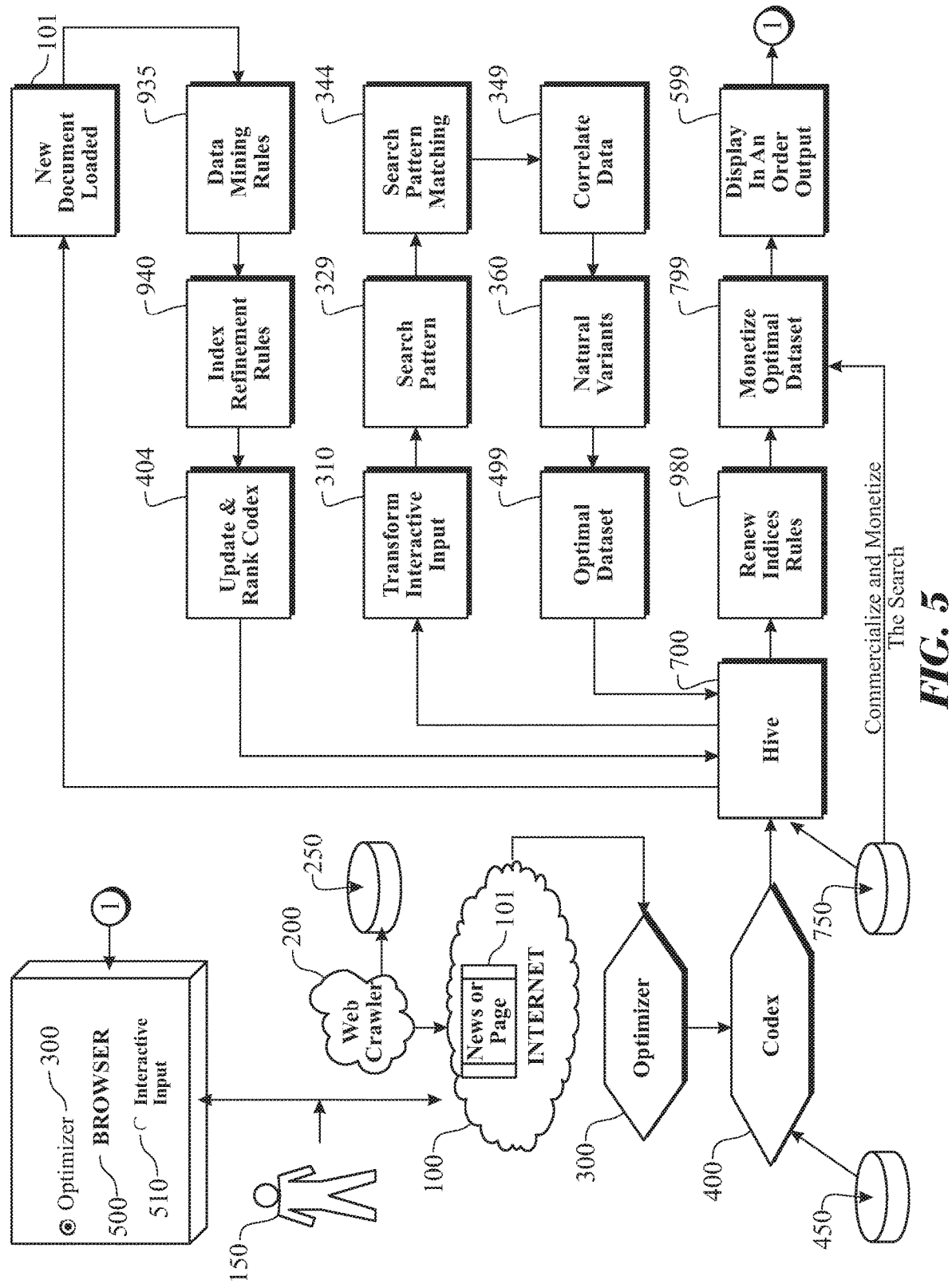
FIG. 5 presents schematic operational flow diagram applying of an exemplary summit cluster system.

FIG. 5 presents an exemplary summit cluster system or The Hive 700 that coordinates the Codex 400 and the use of web crawlers 200 to continuously gather, distill and analyze the Internet environment 100 using Index Refine Rules 940 in order identify updated and recent News and content Documents 101 and then parse 302, prime 304, trend data 306 and correlate data into valid search patterns 329 and then proactively send output 599 to users 150.

The Codex system 400 stores hierarchically the entire superset of regular expressions and human knowledge search patterns 329 into the Encyclopedia data warehouse 450.

The Codex system 400 and the Optimizer 300 use human knowledge derived from the encyclopedia 450 in order to perform Informatics Set theory constructs 'CORE Element' Rules of semantic 900 to create new entities using Static Analysis 910 rules of semantic to execute informatics set of instruction to identify positional 950, probable 960 and plausible 970 branching of human knowledge concepts and ideas to inventory the Internet 100.

This task is performed measuring the human side of the equation with business intelligence metrics executing Dynamic Analysis 920 Rules of Semantics that allow interactive input 510 obtained from computing devices belonging to end user 150 to transform input 310 using patterns of behavior to personalize the search pattern 329.

Now, performing informatics set of instruction based on and Index Refine 940 Rules of Semantics a partial master index 407 for a particular search patterns 329 possessing index relationship (I) to normalize the searchable environment 107 to create the improve environment 307 that is the first layer of refinement and informational certainty. Applicant claims the benefit of U.S. patent application Ser. No. 11/584,941 filed on Oct. 23, 2006 (issued as U.S. Pat. No. 7,809,659 on Oct. 5, 2010) for previous disclosure of this function.

Further refinement assigns index relationship (J) using linguistics and trending data 306 to discover associative entities of the particular search pattern 329 to create a subset of the improved environment 307, known as an optimal environment 350 that is the second layer of refinement and informational certainty. Applicant claims the benefit of U.S. patent application Ser. No. 11/584,941 filed on Oct. 23, 2006 (issued as U.S. Pat. No. 7,809,659 on Oct. 5, 2010) for previous disclosure of this function.

Further refinement assigns index relationship (K) using linguistics and correlated data 349 to discover transitive entities of the particular search pattern 329 to create a subset of the optimal environment 350, known as the optimal dataset 499 that is the third layer of refinement and informational certainty. Applicant claims the benefit of U.S. patent application Ser. No. 11/584,941 filed on Oct. 23, 2006 (issued as U.S. Pat. No. 7,809,659 on Oct. 5, 2010) for previous disclosure of this function.

Finally, performing index refinement to the (nth) to pick the output 599 that is sent as output to the user in an order from highest and lowest that becomes human indicia for monitoring and evaluation that inventory the content of the Internet environment 100.

The Codex system 400 particular programmed to parse documents 302 and upon determining portions thereof having relevance to monitoring and valuation from the most recent primed data 304 received as Trending Data 306 using Data Mining Rules of Semantics 935 that determine the freshness, volatility and elasticity of the significant changes in order to measure trending in real time using informatics set theory constructs based on Index Refinement Rules 940 of Semantics in order to update the Encyclopedia 450.

The Codex system 400 search pattern matching 344 the primed data 304 and trending Data 306 to the end user's Recognized Search Pattern 329 in order to proactively generate optimal input to gain factoring associative and transitive entities as relevant and likely and attenuate entities that are irrelevant and unlikely to probabilistically measure the optimal spatial environment or dataset 499 and pick the personalized output 599 that is sent to the user 150 in an order from highest to lowest. Applicant relies upon the claimed benefit of U.S. patent application Ser. No. 12/146, 420, filed on Jun. 25, 2008 (issued as U.S. Pat. No. 7,908, 263 on Mar. 11, 2011) for previous disclosure of this function.

The Hive 700, updates the 204 Encyclopedia 450, and keeps track of each end user's Search Pattern 329 for human monitoring and evaluation.

The Hive 700 system updates and renews the plurality of partial indices 980 and proactively build dataset 499 using Encyclopedia 450, and Webpage database 250 that is automatically storing for historical analysis and communicating updates output 599 of the end user's Recognized Search Pattern 329 to the end user 150 computing device.

The Hive 700 commercializing and monetizing the end user's Search Pattern 329 by incorporating the Media Value database 750 that optimize the financial value of the search using the Shopping Cart and Advertisement subsystem. Using the claimed benefit of U.S. patent application Ser. No. 09/819,174, this is a requirement to give virtual artificial intelligence entities such as the virtual maestro 800 to engage in a substantive communication with the end user 150 using the 850 script database based on the known natural variants 360 in order to promote products and services.

Figure 6:
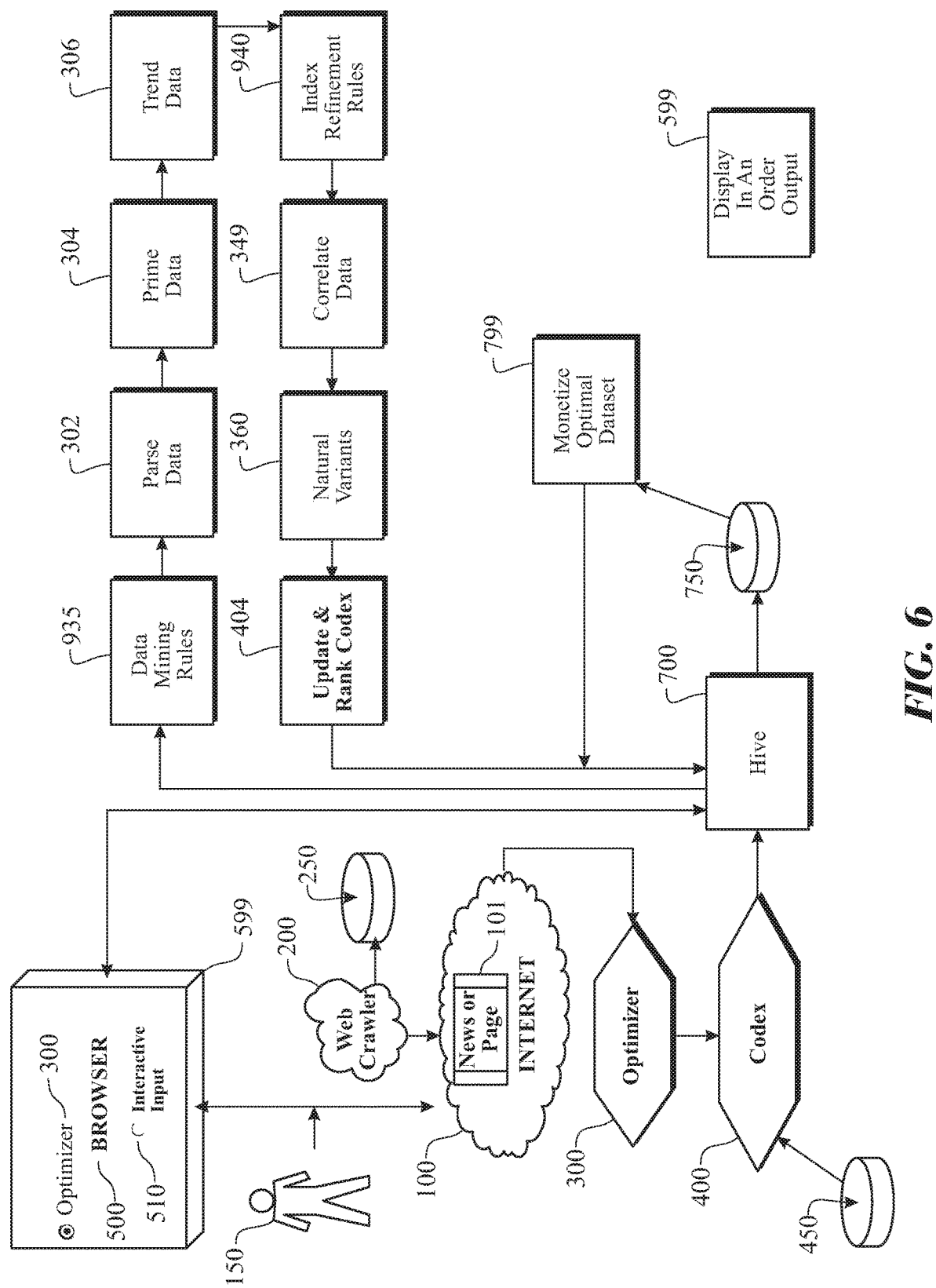
FIG. 6 presents a schematic operational flow diagram describing steps to commercialize/monetize a search.

A block flow diagram, illustrated in FIG. 6, presents how to commercialize and monetize a search using The Hive 700 system that employees the Codex 400 to coordinates the use of web crawlers to continuously gather, distill and analyze the Internet environment 100 in real time as shown in FIG. 5.

The Codex system 400 stores hierarchically the entire superset of regular expressions and human knowledge search patterns 329 into the Encyclopedia 450.

The Codex system 400 and the Optimizer 300 use human knowledge derived from the encyclopedia in order to perform Informatics Set theory constructs Index Refine 940 Rules of Semantics that allow interactive input 510 obtained from computing devices belonging to end user 150 to become transformed input 310 that is optimal input using patterns of behavior to personalize the search pattern 329.

The Codex system 400 particular programmed to parse data 302 and upon determining portions thereof having relevance to monitoring and valuation creates primed data 304 that is analyzed as Trending Data 306 using Data Mining Rules of Semantics 935 that determine the freshness, volatility and elasticity of the significant changes in order to measure trending in real time using informatics set theory constructs based on Positional 950, Probable 960 and Plausible 970 branching in order find natural variants 360 key featured associative and transitive entities to aid the end user in a search and then Updates the Encyclopedia 204.

The Hive 700 monetizes 799 and transforms the optimal dataset 499 searching the Media Value database to add advertisement and shopping cart functionalities to the output 599.

Figure 7:
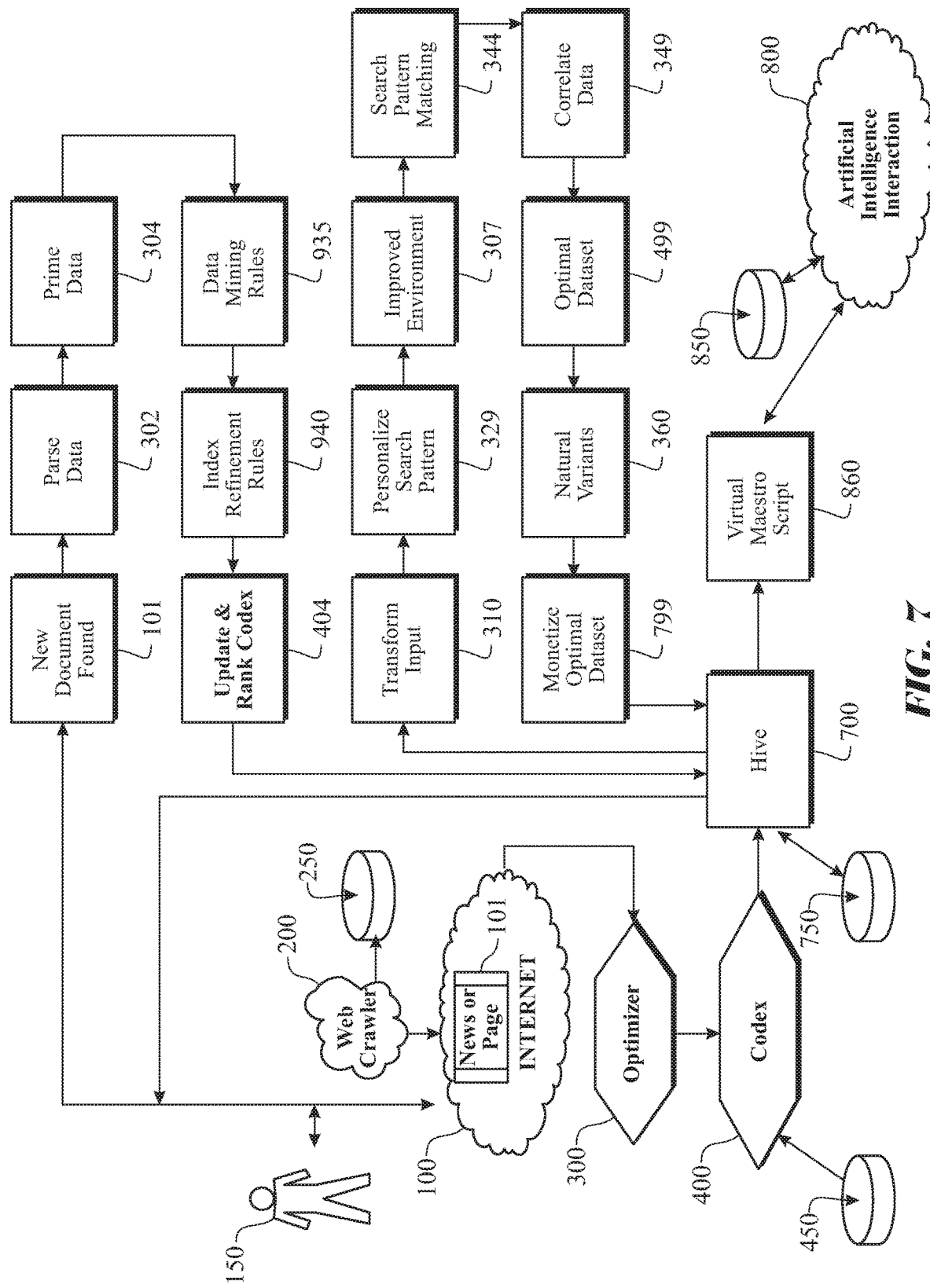
FIG. 7 presents a schematic operational flow diagram describing steps to integrate a virtual maestro.

A block flow diagram, illustrated in FIG. 7, presents of how to integrate a virtual maestro 800. The summit cluster or HIVE system 700 coordinates the Codex 400 and web crawlers 200 to continuously gather, distill and analyze the Internet environment 100 using Index Refine Rules 940 in order identify updated and recent News and content Documents 101 and then parse 302, prime 304 and trend 306 data into valid search patterns 329. The Hive 700 commercializes and monetizes 799 and transforms the optimal dataset 499 using the Media Value database 750 that maps advertisements to the personalized output 599.

The Hive 700 synchronizes all virtual maestro 800 residing on the end user 150 console device to obtain interactively input 510 using the benefit of U.S. patent application Ser. No. 09/819,174 (a parent of this application and incorporated herein by reference) to have an artificial intelligence entities to instantiate substantive communication with end users 150 and promote products and services using the Script database 850.

This application claims priority to U.S. patent application Ser. No. 09/819,174 (incorporated by reference herein), which teaches with regards to the virtual maestro 800 when applied to licensed audio and video intellectual property. The virtual maestro is a product of artificial intelligence can also select and play televised or radio broadcast sports events selected by the individual subscriber. These events are stored in the system memory as they are broadcast from their source, so that the subscriber has the option of having a time delay introduced. The information is stored in the script database 850.

The Hive 700 searches the Codex system 400 that stores hierarchically the entire superset of regular expressions and human knowledge search patterns 329 into the Encyclopedia 450 and upon finding a preprocessed optimal dataset 499 send the output 599 in an order.

The virtual maestro 800 communicates with the Hive 700 using the Optimizer 300 that transforms the interactive audio and text input 510 into an optimal input search pattern 329 to discover within the Encyclopedia 450 the concept and idea the end user 150 and upon receiving the optimal dataset 499 further searches the Script database 850 to find the rules of semantics execute informatics set of instructions using the "profile stored for the individual subscriber" to communicate with the end user 150 and promote licensed intellectual property.

The Hive 700, the Codex system 400 and the Optimizer 300 use human knowledge derived from the encyclopedia 450 in order to perform Informatics Set theory constructs Analysis 900, Dynamic 920 and Index Refine 940 Rules of Semantics that allow interactive input 510 obtained from computing devices belonging to end user 150 to be transformed into search patterns 329 for human monitoring and evaluation, using usage patterns of behavior to cross reference against changes to the Internet environment 100.

The Codex system 400 particular programmed to parse document and upon determining portions thereof having relevance to monitoring and valuation from the most recent primed data 304 received as Trending Data 306 using Data Mining Rules of Semantics 935 that determine the freshness, volatility and elasticity of the significant changes in order to measure trending in real time using informatics set theory constructs based on Index Refinement Rules 940 of Semantics in order to Update the Encyclopedia 204.

The Codex system 400 searches the Encyclopedia 450 performing Search Pattern Matching 344 based on the end user's trending data 306 in order to generate optimal dataset 499 after correlate data 349 of the Improved Environment 307, and then using informatics set theory constructs based on Positional 950, Probable 960 and Plausible 970 branching in order find natural variants 360 key featured associative and transitive entities to aid the end user in a search.

The Hive 700 uses the Media Value database 750 to commercialize and monetize 799 the optimal dataset 499 and communicating updates output 599 to the end user 150.

The virtual maestro 800 using the Script database 850 communicating updates output 599 to the end user 150 and uses the natural variants 360 key featured associative and transitive entities to enhance the communication with the end user 150 and seem smart as if it were a human.

Furthermore, the virtual maestro 800 searches the script database 850 to maximize advertisement revenues, as described in U.S. patent application Ser. No. 09/819,174. The supplier gains additional revenues through delivery of advertising segments on the computer speakers or on the computer monitor of the users, as applicable and these ads preferably run just prior to playing of the work. This method of advertising delivery is similar to the placement of movie trailers at the beginning of pre-recorded movie videotapes. Alternatively, advertising can be presented in pop-up form on subscriber monitors during the playing of the work. The selection of works by each subscriber is recorded and stored for marketing purposes and for automatic selection of works for the subscriber, such as by a virtual maestro as described below. This information is used in part to customize the advertising displayed for the particular subscriber during playing of subsequently selected works. One such form of customized advertising is song or video previews which seem to fit within the established and individualized pattern of individual subscriber access. The accessed and played works also help a subscriber decide whether to purchase a compact disk or audio tape of a musical selection, or a digital video disk or video tape of a movie or music video. Such purchase is optionally offered through the supplier. In this way the system boosts rather than competes with compact disk and video sales. In this case the supplier is the Codex 400 using business intelligence through the virtual maestro 800.

Figure 8:
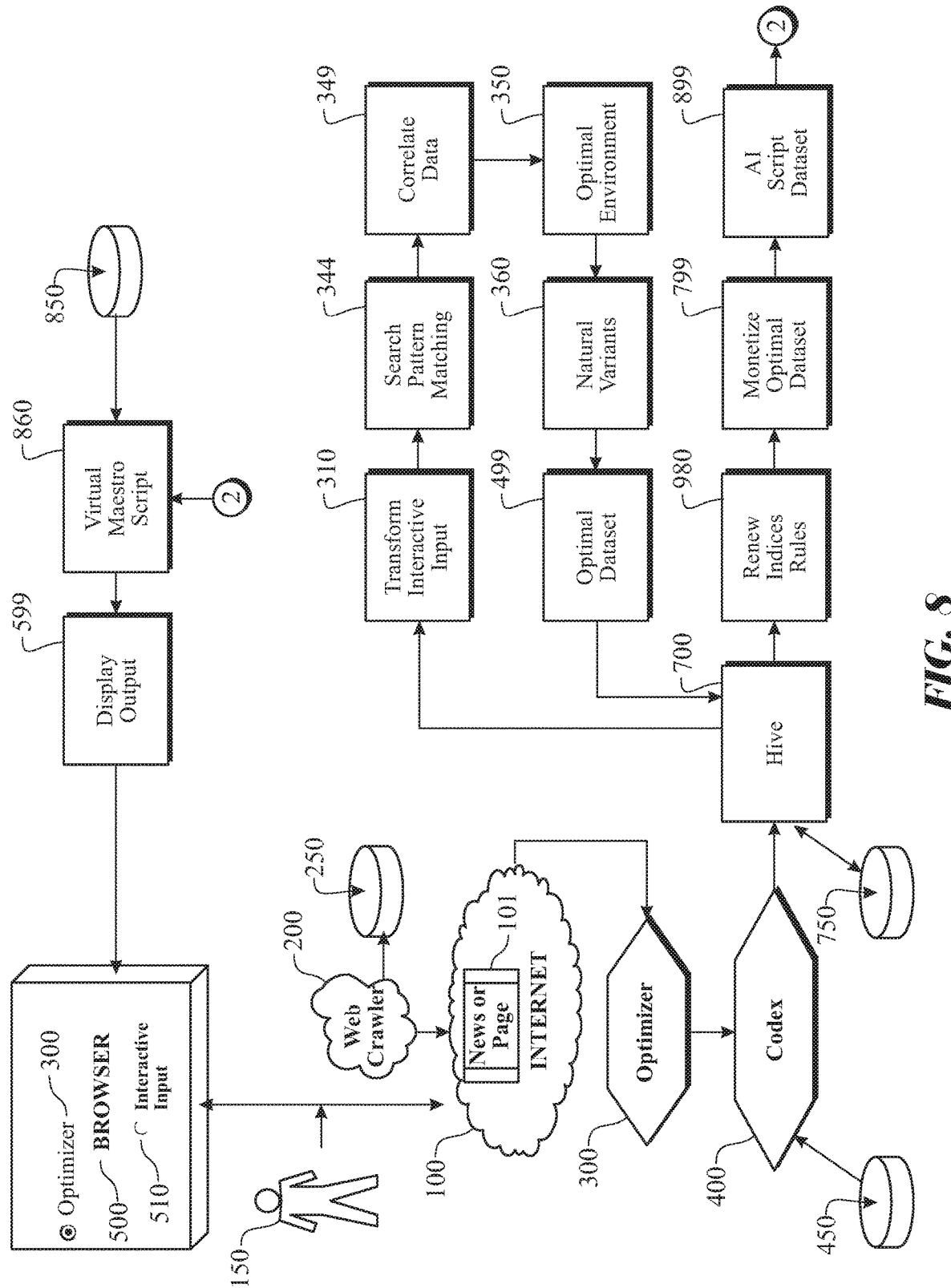
FIG. 8 presents a schematic operational flow diagram describing how a virtual maestro communicates.

A block flow diagram, illustrated in FIG. 8, presents of Rules of Semantics for personalized objects. The summit cluster or the Hive 700 performs all the tasks presented in FIG. 7, executes software instructions in particular to load balances and Updates 204 the Encyclopedia 450, and keeps tract each end user's 150 search pattern 329 for human monitoring and evaluation.

The Hive 700 system updates and renews 407,422 all partial master indices and proactively build dataset 499 using the Encyclopedia 450 that automatically communicates updates output 599 to the end user 150 upon detecting a recognized search pattern 329.

The Hive 700 commercializes and monetizes 799 and transforms optimal dataset 499 to incorporates Shopping cart and Advertisement functionalities using the Media Value database 750, now the virtual maestro 800 uses the Optimizer 300 executing informatics set of instruction to analyze the output 599 using the Script database 850 to instantiate communication with the end user 150 since they know and understand what they are searching.

Virtual Maestro 850 Interaction with the End User 150.

For example: When the user transforms saying or typing "BIL" into "BILLY JOEL" by selecting a command instruction, the end user has selected a concise search 469 and then user continues to type or say "JU" that becomes "BILLY JOEL JUST THE WAY YOU ARE" by selecting a command instruction, the end user has selected a concise search natural variant; afterwards the user continues to type "HD" as in high definition quality that becomes "HD BILLY JOEL JUST THE WAY YOU ARE" by selecting a command instruction, the user has selected a precise search 479, now the Codex system 400 analyzing the usage pattern identifies the copyrighted intellectual property that is an optimal search 489.

Now the virtual maestro 800 licenses and displays the intellectual property.

For example: Based on the copyrighted intellectual property that was licensed, the virtual maestro 800 interacting with the end user 150 to obtain the end user demographics, satisfiers and dissatisfiers that enhance the quality of the interaction with the human.

For example: The end user 150 ask for the virtual maestro 800 to monitor and update the World Cup qualifiers, immediately the question will be what type of event, otherwise the system would inundate the human with too much trivia information. The user forgets to place a restriction and virtual maestro 800 says player A got a yellow card, player B is about to shot a corner kick, etc. After a while of being overwhelmed, just update goals, end scores, and red card and penalty kicks, and let me see all the video highlights of the same for the Argentina vs. Colombia game, relying upon the claimed benefit of U.S. patent application Ser. No. 10/603,963, filed on Jun. 25, 2003 (issued as U.S. Pat. No. 6,614,893 on Sep. 2, 2003), the virtual maestro 800 as part of the Codex 400 can continuously scans and gathers information from, understands, and interacts and automatically detect the optimal dataset and engage in a direct communication with the human. License, monetize and commercialized means that all the audio and video intellectual property stored in the Codex 400 presented to the end user 150 by the virtual maestro 800. Virtual maestro 800 can also analyze and comment the music from its own perspective or based on trending specific to demographics.

REFERENCE ELEMENT DESCRIPTIONS

| Ref. No. | Description |
| --- | --- |
| 100 | Internet |
| 101 | New Document |
| 107 | Searchable Environment |
| 150 | End User |
| 200 | Web Crawler |
| 250 | Webpage Database |
| 299 | Save Optimal Dataset |
| 300 | Optimizer |
| 302 | Parse Data |
| 304 | Prime Data |
| 306 | Trend Data |
| 307 | Improved Environment |
| 310 | Transform Input |
| 329 | Search Pattern |
| 334 | Inventory Environment |
| 344 | Pattern Matches |
| 349 | Correlate Data |
| 350 | Optimal Environment |
| 360 | Natural Variants |
| 400 | Codex |
| 404 | Update and Rank Codex |
| 407 | Renew Partial Indices |
| 422 | Renew New Master Index |
| 450 | Encyclopedia |
| 464 | Concise Search Variants |
| 469 | Concise Search Object |
| 474 | Precise Search Variants |
| 479 | Precise Search Object |
| 484 | Optimal Search Variants |
| 489 | Optimal Search Object |
| 499 | Send Optimal Dataset |
| 500 | Browser |
| 510 | Interactive Input |
| 599 | Output |
| 700 | Hive |
| 750 | Media Value Database |
| 799 | Monetize Optimal Dataset |
| 850 | Script Database |
| 860 | Virtual Maestro Software |
| 899 | Artificial Intelligence Script Interaction Dataset |
| 900 | Core List Element Rules |
| 910 | Static Rules |
| 920 | Dynamic Rules |
| 935 | Data Mining Rules |
| 940 | Index Refine Rules |
| 950 | Positional Branching |
| 960 | Probable Branching |
| 970 | Plausible Branching |
| 980 | Renew Indices Rules |
| 981 | First Variance |
| 982 | Gain Factor Environment |
| 985 | Second Variance |
| 986 | Attenuate Environment |
| 988 | Third Variance |
| 990 | New Master Index Rules |
| 995 | Replace Old Master Index |
| 999 | Actuate New Master Index |

What is claimed is:

1. A Codex providing a comprehensive human knowledge encyclopedia system, the Codex including a web crawler software executing instructions based on business intelligence to transform raw documents into validated data and then store the validated data into the Codex, an optimizer software residing in a computing device memory, the optimizer software operating on a microprocessor executing instructions based upon rules of grammar and semantics to transform input into search patterns and then store the search patterns, and a webpage database residing in the Codex, the webpage database having a master index and a partial master index for each element of the Codex, a computing device in digital communication therewith to search the Codex, the Codex being a method comprising steps of:

continuously scanning, distilling and analyzing an Internet and coordinating at least one web crawler executing software instruction based on business intelligence to transform raw data into validated data for human monitoring and evaluation, and then statistically determining a content value obtained from the validated data and storing the statistical information into the webpage database;

the optimizer receiving a computing device interactive input;

the optimizer executing software instructions that transforms input based on rules of grammar and semantics into search patterns, wherein the optimizer probabilistically supplies and inserts missing gaps of information, including GPS coordinates from the computing devices, wherein the optimizer creates a search pattern profile based on the interactive input entered by an end user, hereinafter personalize a search pattern;

assigning each search pattern to a searchable environment using Boolean Algebra to eliminate irrelevant pages, wherein performing positional branching upon executing software instructions based on rules of semantics to identify concepts and ideas and then storing them as concise search patterns, into the Codex;

correlating an improved environment after normalizing data and eliminating redundancy from the searchable environment to probabilistically rank each page of the improved environment and corresponding partial master index in the webpage database;

index refining the improved environment and performing probable branching upon executing software instructions based on rules of semantics and linguistics to identify key featured associations, (hereinafter associated keywords) and then storing them as precise search patterns, into the Codex;

mapping a significant event environment after executing software instructions maximizing related objects and minimizing confounding elements to probabilistically rank each page of the significant event environment and corresponding partial master index in the webpage database;

index refining the significant event environment and performing plausible branching upon executing software instructions based on rules of semantics and linguistics to identify key featured transitive, (hereinafter transitiveness keywords) and then storing them as significant event search patterns, into the Codex;

selecting a dataset of highest relevance content from the significant event environment after executing software instructions using the personalized search pattern based on the end user's pattern of behavior to maximizing keyword values by dynamically measuring the relevance of a keyword in a user search session based on usage patterns and removing irrelevancy to probabilistically rank each page of the dataset of highest relevance and corresponding partial master index in the webpage database;

picking and arranging, in an order from highest to lowest, from the dataset of highest relevance the top ranked valued (n) responses as output based on the based on the end users pattern of behavior;
storing the output into the Codex as a pre-fabricated summary report object; and
displaying the pre-fabricated summary report object to the user as output.

2. A Codex as recited in claim 1, the method further comprising: continuously scanning, distilling and analyzing the Internet and coordinating at least one web crawler executing software instructions based on business intelligence to transform raw data into validated data for human monitoring and evaluation.

3. A Codex as recited in claim 1, comprising a web crawler software executing instructions based on business intelligence to verify the quality of the content of documents into statistical data and then store them into the Codex, and a webpage database, the method further comprising steps of:
residing in the Codex that stores and renews in the non-volatile digital memory, the master index and the partial master index for each element of the Codex;
determining the content value obtained from said validated data to measure the relevancy in order to determine direct relationships and emphasizing high probability categories and trending value to determine within the content search patterns that best reflects the latest trending of all the end user's interacting with a particular search engine supercomputer, of each page; and
storing the statistical information into the webpage database.

4. A Codex as recited in claim 1, comprising a webpage database residing in the Codex that stores in a non-volatile digital memory, the searchable environment and the partial master index for each element of the Codex, the method further comprising steps of:
continuously scanning, distilling, analyzing the searchable environment coordinating at least one web crawler executing software instructions based on business intelligence;
index refining the searchable environment;
performing positional branching upon executing software instructions based on rules of semantics to identify concepts and ideas; and
storing the concepts and ideas as concise search patterns, into the Codex.

5. A Codex as recited in claim 4, comprising a webpage database residing in the Codex and stored in a non-volatile digital memory, the searchable environment, improved probabilistic spatial environment, and the first variance sample for each element of the Codex, the method further comprising steps of:
correlating an improved environment after normalizing data and eliminating redundancy from the analysis of the searchable environment;
determining until reaching the first variance sample size and saving the highest probability site and pages as the significant event dataset and removing the remainder;
picking and arranging, in an order from highest to lowest, the responses of the significant event dataset as output based on personalized search pattern based on the end user's usage pattern of behavior;
storing the output into the Codex as a pre-fabricated Summary Report object; and
displaying the output to the user.

6. A Codex as recited in claim 4, comprising a webpage database residing in the Codex and stored in a non-volatile digital memory, the improved environment and the partial master index for each concise search element of the Codex, the method further comprising steps of:
index refining the improved environment; and
performing probable branching upon executing software instructions based on rules of semantics and linguistics to identify associated keywords;
storing into the Codex, the associated keywords as precise search patterns; and
to probabilistically rank each page of the improved environment and corresponding partial master index in the webpage database.

7. A Codex as recited in claim 4, further comprising a webpage database residing in the Codex and stored in a non-volatile digital memory, the improved environment, the partial master index and the set of key featured associations, for each element of the Codex, the method further comprising steps of:
index refining the improved environment and performing probable branching upon executing software instructions based on rules of semantics and linguistics to identify associated keywords;
storing associated keywords as precise search patterns, into the Codex;
determining until reaching the second variance sample size and saving the highest probability site and pages as the significant event dataset and removing the remainder;
picking and arranging, in an order from highest to lowest, the responses of the significant event dataset as output based on the end user's usage pattern of behavior;
storing the output into the Codex as a pre-fabricated Summary Report object; and
displaying the output to the user.

8. A Codex as recited in claim 7, further comprising storing in the non-volatile digital memory, the significant event environment and the output for each element of the Codex, the method further comprising steps of:
index refining the significant event environment;
performing plausible branching upon executing software instructions based on rules of semantics and linguistics to identify transitiveness keywords and storing the transitiveness keywords as significant event search patterns, into the Codex;
selecting an significant event dataset from the significant event environment after executing software instructions using the personalized usage pattern of behavior to probabilistically maximize relevancy of codex pages based on the index relationships in order to obtain top (n) web pages of each category and their significant event inventory control data structure containing related objects;
removing irrelevancy;
picking and arranging in an order from highest to lowest, the responses of the significant event dataset as output based on the end user's usage pattern of behavior;
storing the output into the Codex as a pre-fabricated summary report object; and
displaying the output to the user.

9. A Codex as recited in claim 1, comprising a webpage database residing in the Codex and stored in a non-volatile digital memory, the significant event environment and the partial master index for each element of the Codex, the method further comprising steps of:
index refining the significant event environment performing plausible branching after performing software instructions that probabilistically maximizes related objects; and removing confounding elements;
storing the confounding elements as significant event search patterns, into the Codex; and
to probabilistically rank each page of the significant event environment and corresponding partial master index in the webpage database.

10. A Codex as recited in claim 1, comprising a webpage database residing in the Codex and stored in a non-volatile digital memory, the significant event environment, the partial master index and the set of key featured transitiveness, for each element of the Codex, the method further comprising steps of:
index refining the significant event environment;
performing plausible branching upon executing software instructions based on rules of semantics and linguistics;
determining until reaching the third variance sample size;
saving the top pages as the significant event dataset and probabilistically removing the remainder;
picking and arranging in an order from highest to lowest, the responses with highest combined site and webpage probability of the significant event dataset as output based on the end users pattern of behavior based on the end user's usage pattern of behavior;
storing the output into the Codex as a pre-fabricated Summary Report object; and
displaying the output to the user.

11. A Codex as recited in claim 10, comprising a webpage database residing in the Codex that stores in a non-volatile digital memory, the optimal dataset, the partial master index and the output, for each element of the Codex, the method further comprising steps of:
selecting a significant event dataset from the third variance sample after executing software instructions using the personalized usage pattern of behavior to probabilistically maximize relevancy and removing irrelevancy;
picking and arranging in an order from highest to lowest, from the significant event dataset the top responses as output based on the end user's usage pattern of behavior;
storing the output into the Codex as a pre-fabricated Summary Report object; and
displaying the output to the user.

12. A Codex as recited in claim 1, comprising a webpage database residing in the Codex that stores in a non-volatile digital memory, the optimal dataset, the partial master index and the output, for each element of the Codex, the method further comprising steps of:
selecting an significant event dataset from third variance sample after executing software instructions output using the end user's usage pattern of behavior maximizing relevancy and removing irrelevancy, and
ranking each page and site of the significant event dataset and corresponding partial master index in the webpage database.

13. A Codex as recited in claim 1, comprising an optimizer software residing in a non-volatile computing device memory, executing instructions based on rules of grammar and semantics to transform input into search patterns and then store the search patterns, a computing device in digital communication to search the Codex, and a webpage database residing in the Codex that stores in memory the concise search pattern, the partial master index and the output, for each element of the Codex, the method further comprising a step of:
the optimizer receiving a search pattern from a computing device;
searching the webpage database;
based on rules of semantics and linguistics, identifying a concise search pattern;
picking from the corresponding partial master index, the highest probability page and site ranked responses arranged in an order from highest to lowest as output; and
sending the output to the user.

14. A Codex as recited in claim 1, the optimizer software residing in a non-volatile computing device memory, the optimizer executing instructions based on rules of grammar and semantics to transform input into search patterns and then store the search patterns, a computing device in digital communication to search the Codex, and a webpage database residing in the Codex and stored in the non-volatile computing device memory, the precise search pattern, the partial master index and the output, for each element of the Codex, the method further comprising steps of:
the optimizer receiving a search pattern from a computing device;
searching the webpage database and based on rules of semantics and linguistics;
identifying a precise search pattern;
picking from the corresponding partial master index, the highest probability page and site ranked responses arranged in an order from highest to lowest as output; and
sending the output to the user.

15. A Codex as recited in claim 1, the optimizer software residing in a non-volatile computing device memory, the optimizer software executing instructions based on rules of grammar and semantics to transform input into search patterns and then store the search patterns, a computing device in digital communication to search the Codex, and a webpage database residing in the Codex and stored in the non-volatile computing device memory, the significant event search pattern, the partial master index and the output, for each element of the Codex, the method further comprising a step of:
an optimizer that receives a search pattern from the computing device;
searching the webpage database; and
identifying an significant event search pattern based on rules of semantics and linguistics;
picking from the corresponding partial master index, the highest probability page and site ranked responses arranged in an order from highest to lowest as output; and
sending the output to the user.

16. A Codex comprising a web crawler software executing instructions based on business intelligence to transform raw documents into validated data, then store the validated data into the Codex, a computing device in digital communication to search the Codex, and a webpage database residing in the Codex and stored in non-volatile digital memory, a master index and a partial master index for each element of the Codex, the Codex being a method comprising steps of:
an optimizer receiving from a computing device interactive input;
executing software instructions transforming input based on rules of grammar and semantics into search patterns;
the optimizer probabilistically supplying and inserting missing gaps of information, including Global Positioning System (GPS) coordinates from computing devices to personalize a search pattern;

correlating the search pattern to an improved environment after normalizing data and eliminating redundancy;

executing software instructions from the correlating of the improved environment;

determining and categorizing the data by measuring a relevancy of each search pattern within the content;

determining a significant event dataset after executing software instructions based on an end user's interactive input probabilistic identified data;

picking and arranging, in an order from highest to lowest, from the significant event dataset the highest probability site and webpage combination responses as output based on the end user's interactive input; and displaying the output to the end user.

17. A Codex as recited in claim 16, comprising a webpage database residing in the Codex and storing in a non-volatile, digital memory device, the searchable environment, the improved environment and the first variance sample for each element of the Codex, the method further comprising steps of:

mapping an improved environment after normalizing data;

eliminating redundancy from the analysis of the searchable environment;

determining until reaching the first variance sample size; and saving the top pages as the significant event dataset and probabilistically removing the remainder of the pages.

18. A Codex system as recited in 16, comprising a webpage database residing in the Codex and storing in a non-volatile, digital memory device, the improved environment, the partial master index and the optimal dataset for each search pattern element of the Codex, the method further comprising steps of:

correlating the search pattern to an improved environment after normalizing data and eliminating redundancy;

executing software instructions from the analysis of the improved environment; and determining the data value by categorizing and measuring the relevancy of each search pattern within the content.

19. A Codex comprising an optimizer software residing in a non-volatile computing device memory executing instructions based on rules of grammar and semantics to transform input into search patterns and the store the search patterns, a computing device is in digital communication to search the Codex, and a webpage database residing in the Codex that stores in memory a master index and a partial master index for each element of the Codex, the Codex being a method comprising steps of:

an optimizer receiving from a computing device interactive input;

executing software instructions that transforms input based on rules of grammar and semantics into search patterns;

probabilistically supplying and inserting missing gaps of information, including Global Positioning System (GPS) coordinates from computing devices to improve a search pattern;

mapping the search pattern to an element stored in the Codex;

upon identifying a search pattern, obtaining a significant event dataset from the Codex;

bypassing all calculations significant event dataset is readily available; and picking and arranging, in an order from highest to lowest, from the significant event dataset, the highest probability site and page responses as output; and displaying the output to an end user.

20. A Codex comprising an optimizer software residing in a non-volatile computing device memory, the optimizer executing instructions based on rules of grammar and semantics to transform input with certainty into a search pattern and then store the search pattern, a computing device in digital communication to search the Codex, and a webpage database residing in the Codex and storing in non-volatile digital memory, a master index and a partial master index for each element of the Codex, the Codex being a method comprising steps of:

an optimizer receiving from a computing device interactive input, and then executing software instructions transforms input based on rules of grammar and semantics an exact search patterns and adding Global Positioning System (GPS) coordinates from computing devices to improve the search pattern into a direct input, wherein the optimizer, with certainty, maps automatically input to output;

mapping the search pattern to an element stored in the Codex, and upon identifying a search pattern with certainty, obtaining a final destination from the Codex, bypassing all calculations since final destination is readily available; and sending the final destination to an end user.

* * * * *